(12) United States Patent
 Corella et al.

(10) Patent No.: US 8,452,749 B2
(45) Date of Patent: May 28, 2013

(54) BROWSING REAL-TIME SEARCH RESULTS EFFECTIVELY

(75) Inventors: Francisco Corella, San Diego, CA (US); Karen Pomian Lewison, San Diego, CA (US)

(73) Assignee: Pomian & Corella, LLC, San Jose, CA (US)

( * ) Notice: Subject to any disclaimer, the term of this patent is extended or adjusted under 35 U.S.C. 154(b) by 0 days.

(21) Appl. No.: 13/437,927

(22) Filed: Apr. 2, 2012

(65) Prior Publication Data

US 2012/0254776 A1    Oct. 4, 2012

Related U.S. Application Data

(60) Provisional application No. 61/470,971, filed on Apr. 1, 2011.

(51) Int. Cl.
 *G06F 17/30* (2006.01)

(52) U.S. Cl.
 USPC .......................................................... 707/706

(58) Field of Classification Search
 USPC .................................................. 707/2, 3, 706
 See application file for complete search history.

(56) References Cited

U.S. PATENT DOCUMENTS

| | | |
|---|---|---|
| 2009/0006358 A1 | 1/2009 | Morris et al. |
| 2011/0154183 A1 | 6/2011 | Burns et al. |
| 2011/0191314 A1 | 8/2011 | Howes et al. |

*Primary Examiner* — Etienne Leroux

(57) ABSTRACT

A method for visiting a results page of a time-varying result set of a search query. The method includes displaying to a user a list of results belonging to the visited page, each result comprising a hyperlink to a document, a result being de-emphasized if the URL used in its hyperlink is present in a set of URLs of results that are deemed to have been seen by the user. When the user clicks or taps a page menu button to navigate to a different page, the method further includes adding to that set the URLs of the results of the visited page. Page menu buttons are highlighted if they pertain to pages containing results deemed to have been seen by the user.

18 Claims, 20 Drawing Sheets

```
                    ┌─1200
            URL  │ http://easy-yummy-smoothies.com/2007/06/13/how-
                 │ to-make-a-fruit-smoothie-mango-banana-orange-      ─ 1210
                 │ smoothie-recipe TITLE│ How To Make A Fruit Smoothie| Mango Banana         ─ 1220
                 │ Orange Smoothie Recipe SNIPPET│ Mango Banana Orange Smoothie Recipe. 2 mangoes
                   │ or 3 cups frozen mango chunks. 1 large
                   │ banana ... Banana Smoothies. Bell Pepper         ─ 1230
                   │ Smoothie. Berry Smoothies ...
```

Figure 12

```
              ┌─1300
1310 ⌐  How To Make A Fruit Smoothie| Mango Banana Orange
         Smoothie Recipe
1320 ⌐  Mango Banana Orange Smoothie Recipe. 2 mangoes or 3 cups
         frozen mango chunks. 1 large banana ... Banana Smoothies.
         Bell Pepper Smoothie. Berry Smoothies ...
1330 ⌐  http://easy-yummy-smoothies.com/2007/06/13/how-to-make-a-
         fruit-smoothie-mango-banana-orange-smoothie-recipe
```

Figure 13

BROWSING REAL-TIME SEARCH RESULTS EFFECTIVELY

CROSS-REFERENCE TO RELATED APPLICATION

The subject matter of this application is related to the subject matter of U.S. Provisional Patent Application No. 61/470,971, filed on Apr. 1, 2011, priority to which is claimed under 35 U.S.C. §119(e) and which is incorporated herein by reference.

GOVERNMENT SUPPORT

This invention was made with Government support under the SBIR Phase I grant number 1013594 awarded by the National Science Foundation. The Government has certain rights in this invention.

BACKGROUND

Whereas traditional search engines provided results from sources such as static Web pages that changed infrequently, modern search engines use sources such as tweets, blog posts, comments, or online news stories that change frequently, and try to deliver results from those sources soon after they appear on the Web. Such results are often called real-time results.

Browsing real-time results means browsing a result set that changes as it is being browsed. Prior to the present invention, allowing the user to browse real-time results effectively has been an open problem.

Some search engines that specialize in real-time results show results ordered by recency, most recent first, in a fast scrolling display. This is not useful as an information retrieval tool because relevant results are swamped by social chatter. Twitter Search supplements such a fast scrolling display with a set of three results deemed to have high relevance, which change infrequently. This is only marginally more useful as an information retrieval tool, due to the fact that only three high-relevance results are shown.

The search engine Topsy ranks results by a weighted combination of recency and relevance, and groups results in pages like traditional search engines do, with a page menu displayed at the bottom of each page for result set navigation. Ranking results by a weighted combination of recency and relevance is useful, but it is difficult for a user to keep track of what results he or she has seen. For example, a user may miss a result that moves from page 2 to page 1 (due to an increase in relevance that outweighs a decrease in recency) as the user advances from page 1 to page 2 while browsing the result set.

Meredith Morris of Microsoft has proposed highlighting results that are new when the user re-executes a query, identifying new results "by comparing the search results of the re-executed query to the previous query" (US Patent Application 2009/0006358, Paragraph 0058). Such a comparison is practically impossible for most queries issued against the World-Wide Web, whose result sets have millions of elements. Furthermore, the proposal does not address the pagination issue, i.e. the problem of keeping track of what results have been seen when results are grouped into pages and the user navigates from one page to another. Furthermore, the proposal would not solve the problem even if it were combined with result set pagination, as it would still be possible to miss a result that moves from page 2 to page 1 as the user advances from page 1 to page 2. It is to be noted that, for example, the ranking of an important tweet based on a weighted combination of recency and relevance may go up for a few hours as it is retweeted, retweets being a signal used to compute relevance, before going down later as the tweet becomes old and is no longer retweeted.

SUMMARY

In one embodiment, a method is provided for visiting a results page of a time-varying result set of a search query. The method includes displaying to a user a list of results belonging to the visited page, each result comprising a hyperlink to a document, a result being de-emphasized if the URL used in its hyperlink is present in a set of URLs of results that are deemed to have been seen by the user. When the user clicks or taps a page menu button to navigate to a different page, the method further includes adding to that set the URLs of the results of the visited page. Page menu buttons are highlighted if they point to pages containing results deemed to have been seen by the user.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Reference numerals consist of a concatenation of a one- or two-digit number referring to a figure, followed by a two-digit number that locates the referenced part within the figure. A reference numeral introduced in a figure may be used in other figures to refer to the same part or a similar part.

FIG. 12 is a block diagram illustrating an example of a search result record, according to one embodiment.

FIG. 13 illustrates an example of a results page, according to one embodiment.

DETAILED DESCRIPTION

This Detailed Description refers to the accompanying drawings, which are a part hereof and illustrate examples of embodiments of the invention. It is to be understood that other embodiments are possible, and that the features of different exemplary embodiments can be combined together unless otherwise stated.

Figure 1:
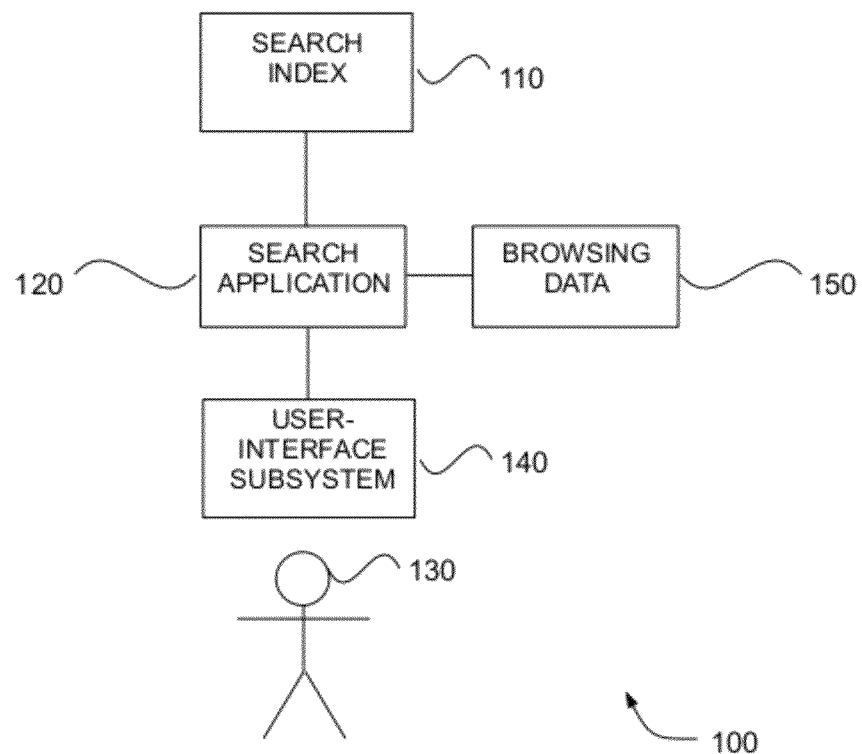
FIG. 1 is a block diagram generally illustrating a system for browsing real-time results of a search query effectively, according to embodiments described herein.

FIG. 1 is a block diagram generally illustrating a system 100 for browsing real-time results of a search query effectively, according to embodiments described herein. (The word "query" is to be understood as meaning "search query" hereinafter.) System 100 includes a search index 110 and a search application 120 that communicates with a user 130 via a user-interface subsystem 140. Search index 110 logically maps a query to a time-varying result set. Search application 120 uses search index 110 to obtain ranges of results of the query at different times. Search application 120 uses browsing data 150 to help user 130 browse the time-varying result set effectively, and in particular to remember results that are deemed to have been seen by user 130 in order to de-emphasize such results and page menu buttons that point to pages containing such results. (A button is said to "point" to a page if it can be used to navigate to the page.) In one embodiment, a result is "deemed to have been seen" (by user 130) if user 130 has previously visited a results page containing the result and then navigated with acknowledgement of the visit, as discussed below in connection with FIG. 14.

Figure 2:
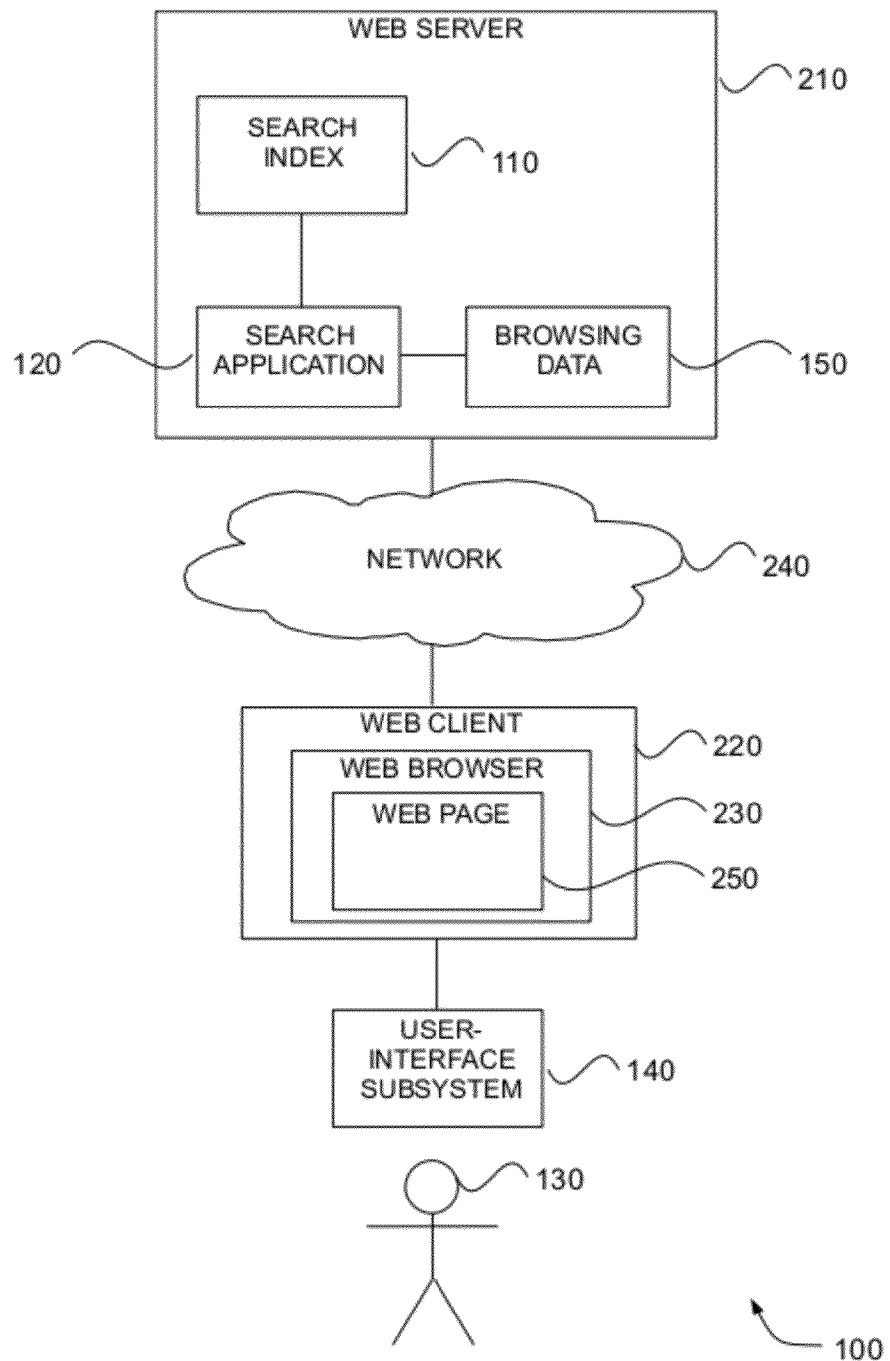
FIG. 2 is a block diagram illustrating a system for browsing real-time results where a search application and a search index reside in a web server computer, according to one embodiment.

FIG. 2 is a block diagram illustrating system 100 according to one embodiment where search application 120, browsing data 150, and search index 110 all reside in a web server computer 210. User-interface subsystem 140 is connected to a web client computer 220 equipped with a web browser program 230. The web client computer 220 is connected to web server computer 210 through a network 240, such as the Internet or an intranet.

(The verb "to reside" is to be understood as synonymous with "to be contained in". Containment is to be broadly construed as being transitive; e.g. if some data is contained in some storage, and that storage is contained in some computer, and that computer is contained in some computer farm, the data shall be said to reside, or be contained, in the computer farm.)

(The word "web", when not capitalized, is to be understood as a reference to the Hypertext Transfer Protocol (HTTP) that is used in the World-Wide Web rather than to the World-Wide Web itself. The term "web client computer" refers to a computer capable of sending HTTP requests and receiving HTTP responses. The term "web server computer" refers to a computer capable of receiving HTTP requests and sending HTTP responses. The term "web page", shall refer to a file written in a version of Hyptertext Markup Language (HTML), such as HTML5, which may include JavaScript code and may incorporate by reference other files such as HTML files, media files, JavaScript files, .XAP files pertaining to the Microsoft Silverlight application framework, and .SWF files pertaining to the Adobe Flash and Adobe Flex application frameworks; it will also be used to refer to a visual rendering of such a file on a display, which meaning is intended being clear from the context. The term "web application programming interface" (web API) shall refer to an interface exposed by a web server computer that lets a web client computer send HTTP requests to the web server computer and obtain HTTP responses containing web pages or data encoded in a language suitable for data structure transmission, such as XML or JSON.)

The connection between user-interface subsystem 140 and search application 120 illustrated by a line in FIG. 1 is realized in FIG. 2 via web client computer 220 and network 240. Search application 120 uses such connection to communicate with user 130 via user-interface subsystem 140, displaying results and other items as output and receiving, as input, notice of user-interface actions performed by user 130. To display results and other items on user-interface subsystem 140, search application 120 creates a web page 250 containing the results and other items, and downloads web page 250 to web browser program 230, which displays it on user-interface subsystem 140. A user-interface action performed by user 130 using user-interface subsystem 140 is detected by web browser 230 and communicated by web browser 230 to search application 120 by sending a HTTP request. In one embodiment, detection of complex user-interface actions, such as holding down a key on a keyboard while clicking on a button, is enabled by JavaScript code embedded (i.e. included or incorporated by reference) in web page 250.

Figure 3:
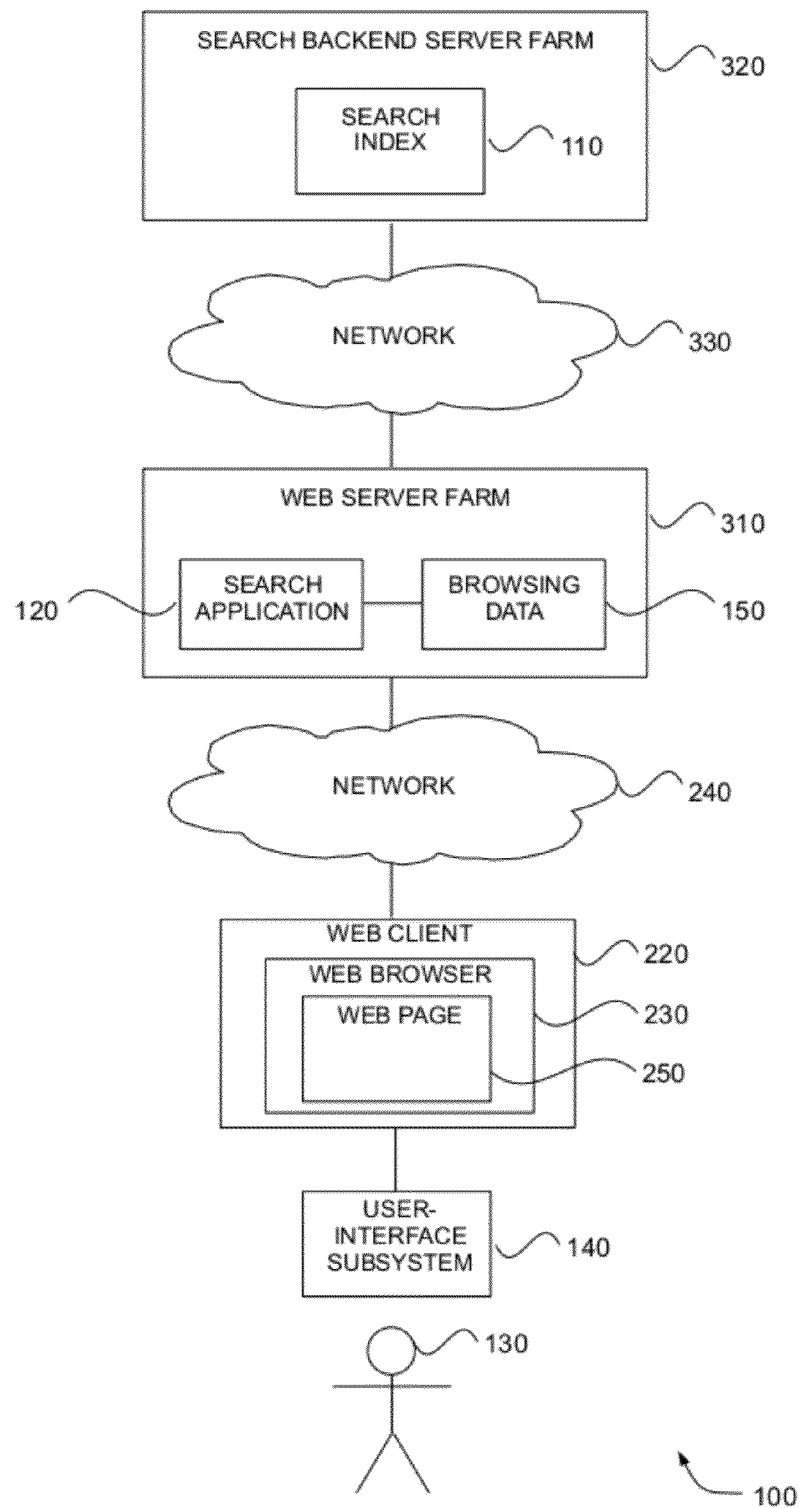
FIG. 3 is a block diagram illustrating a system for browsing real-time results where a search application resides in a web server farm and a search index resides in a search backend server farm, according to one embodiment.

FIG. 3 is a block diagram illustrating system 100 according to one embodiment where search application 120 and browsing data 150 reside in a web server farm 310 comprising one or more web server computers, while search index 110 resides in a search backend server farm 320 comprising one or more server computers of various kinds, web server farm 310 being connected to search backend server farm 320 over a network 330 such as an intranet. Search application 120 communicates with user 130 via user-interface subsystem 140, which is connected to web client computer 220, as described in connection with FIG. 2.

In one embodiment search index 110 is stored in a distributed storage, such as a distributed file system or a distributed database system, contained in the search backend server farm. (The word "storage" is to be understood as referring to a computer readable storage medium. The phrase "storage system" is to be understood as referring to a single computer readable storage medium or a distributed system comprising several computer readable storage media contained in one or more computers.)

In one embodiment, web server farm 310 comprises several web servers and a load balancer that distributes requests addressed to the web server farm among the web servers in the farm, a copy of search application 120 being stored in each of the web servers computers.

Figure 4:
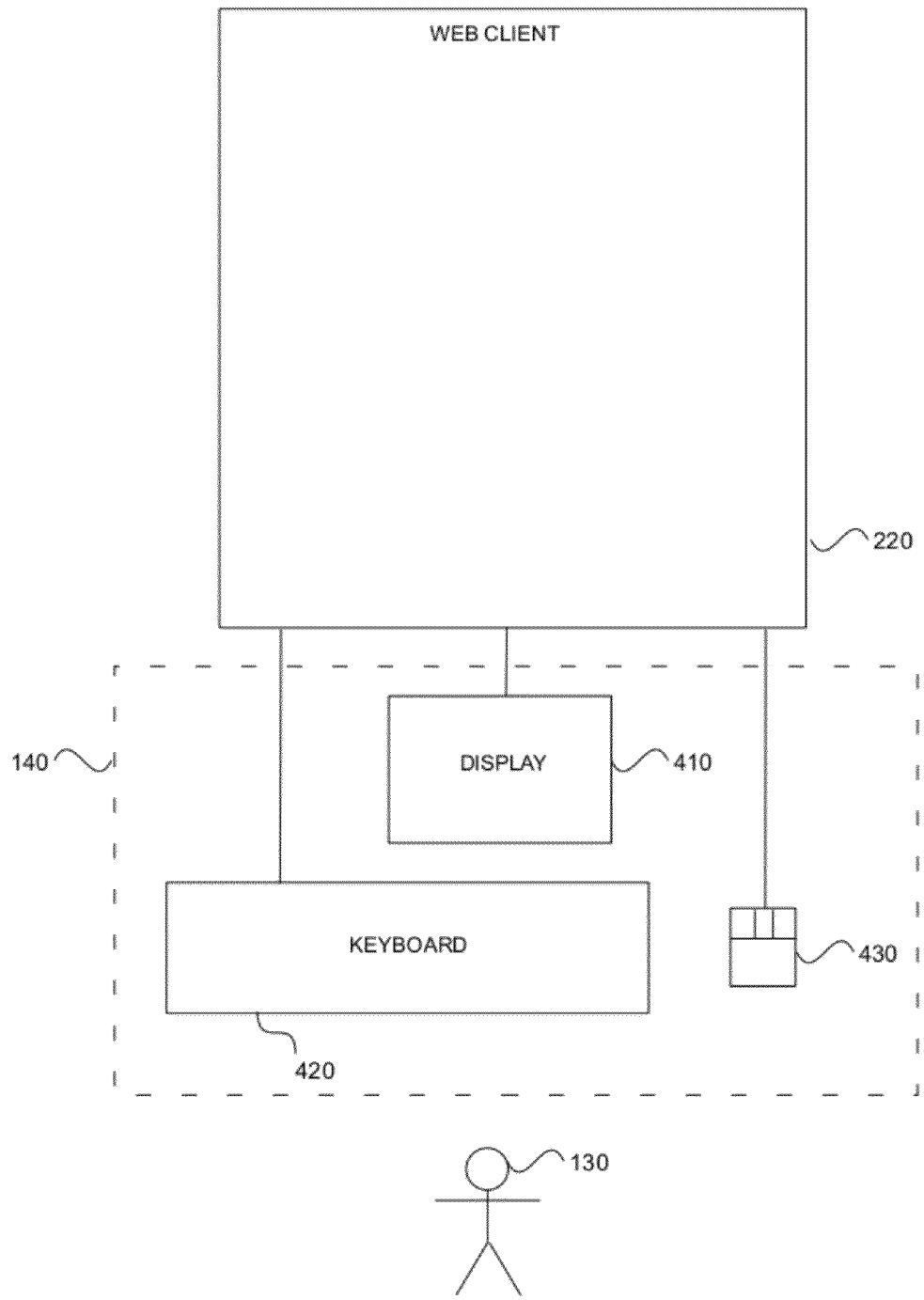
FIG. 4 is a block diagram illustrating a user-interface subsystem comprising a display, a keyboard and a pointing device, according to one embodiment.

FIG. 4 is a block diagram illustrating user-interface subsystem 140 according to one embodiment that features a desktop, laptop or notebook computer in the role of web client computer 220. In the embodiment, user-interface subsystem 140 comprises a display 410, a keyboard 420 and a pointing device 430 such as a mouse, trackball or trackpad, all connected to web client computer 220.

Figure 5:
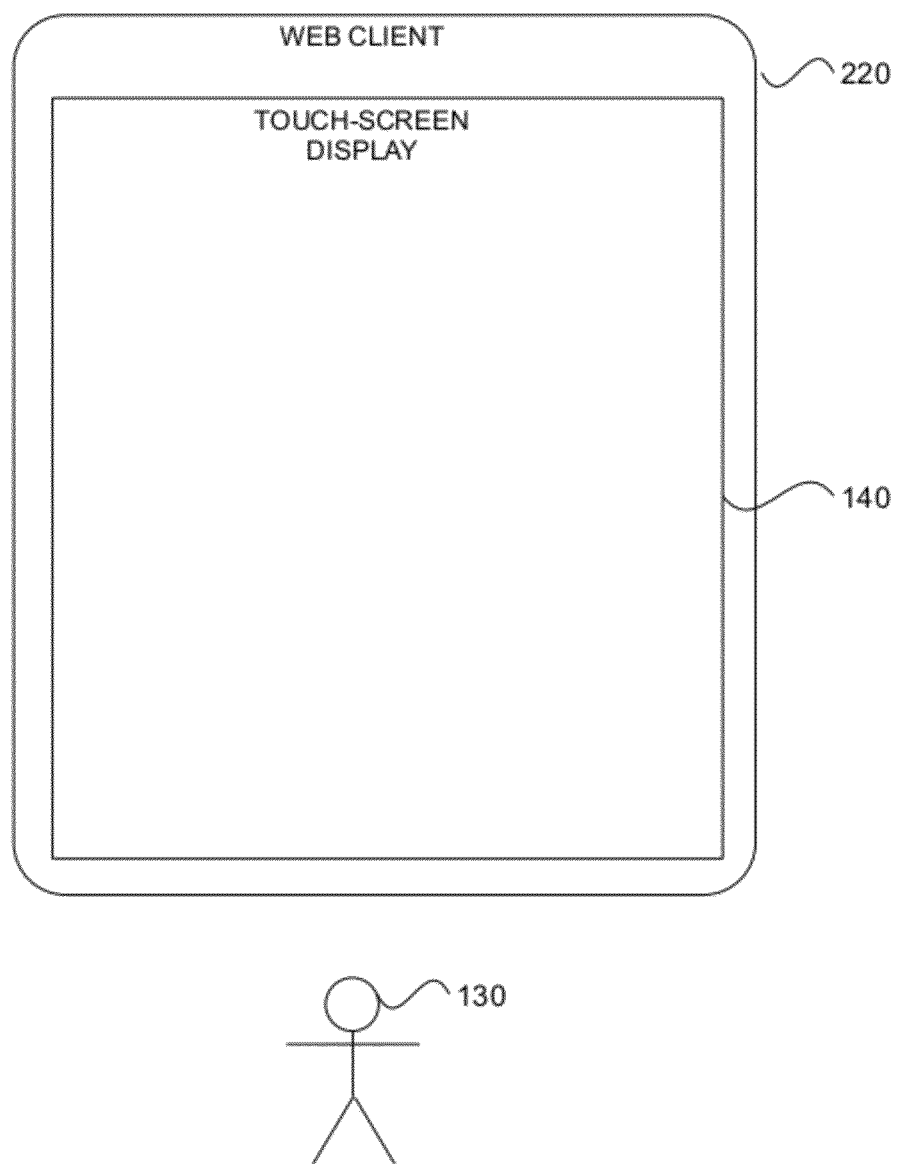
FIG. 5 is a block diagram illustrating a user-interface subsystem comprising a touch-screen device, according to one embodiment.

FIG. 5 is a block diagram illustrating user-interface subsystem 140 according to one embodiment that features a mobile computer device, such as a smart phone or a tablet, in the role of web client computer 220. In the embodiment, user-interface subsystem 140 is a touch-screen display embedded in the device. The connection between web client computer 220 and user-interface subsystem 140 shown by a line in FIGS. 2 and 3 is realized in FIG. 4 by touch-screen display 140 being embedded in the device.

Figure 6:
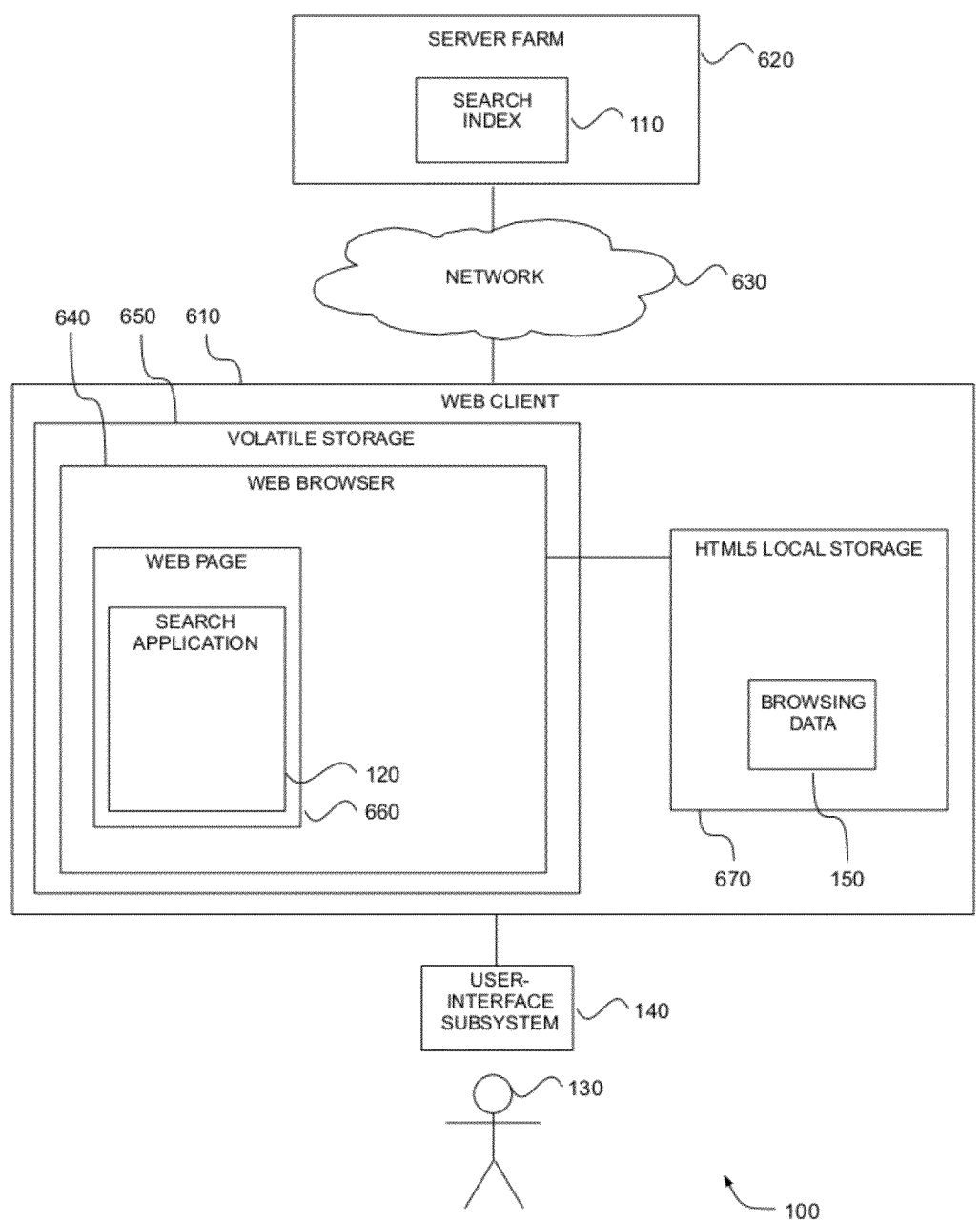
FIG. 6 is a block diagram illustrating a system for browsing real-time results where a search application uses HTML5 local storage, according to one embodiment.

FIG. 6 is a block diagram illustrating system 100 according to one embodiment where search application 120 resides in a web client computer 610 while search index 110 resides in a server farm 620 connected to web client computer 610 through a network 630, such as the Internet or an intranet. Search application 120 accesses search index 110 over network 630 via a web API exposed by server farm 620. In one embodiment server farm 620 comprises a web server subfarm and a backend server subfarm, the web server subfarm comprising several web servers that receive HTTP requests and a load balancer that distributes HTTP requests addressed to the web server subfarm among the web servers in the subfarm, the backend server subfarm containing a distributed storage such as a distributed file system or a distributed database system, search index 110 being stored in the distributed storage.

User 130 communicates with search application 120 via user-interface subsystem 140, which is connected directly to web client computer 610.

Web client computer 610 is equipped with a web browser program 640, which, while running, is stored in a volatile storage 650, a volatile storage being a computer readable storage medium whose contents are lost when power is turned off. Search application 120 is implemented in JavaScript and embedded (i.e. included or incorporated by reference) in a web page 660 that has been downloaded into web browser program 640 running on web client computer 610. Browsing data 150 consists of JavaScript data structures accessible to JavaScript code pertaining to web page 660 but implemented in a persistent, i.e. non-volatile, storage 670 allocated by web browser program 640 in a file system of web client computer 610, according to the "localStorage" feature of HTML5. (Hereinafter, a "HTML5 local storage".)

The fact that browsing data 150 resides in persistent storage makes it possible for user 130 to resume browsing a time-varying result set, after leaving web page 660, after exiting web browser program 640, and even after turning off web client computer 610, without search application 120 forgetting what results are deemed to have been seen. To resume browsing after turning off the computer, user 130 turns the computer back on, restarts web browser 640, and visits again web page 660. This causes search application 120 to be downloaded anew as part of the web page. Search application 120 restarts and finds browsing data 150 in persistent storage 670, whose contents have been preserved while web client computer 610 was turned off.

Figure 7:
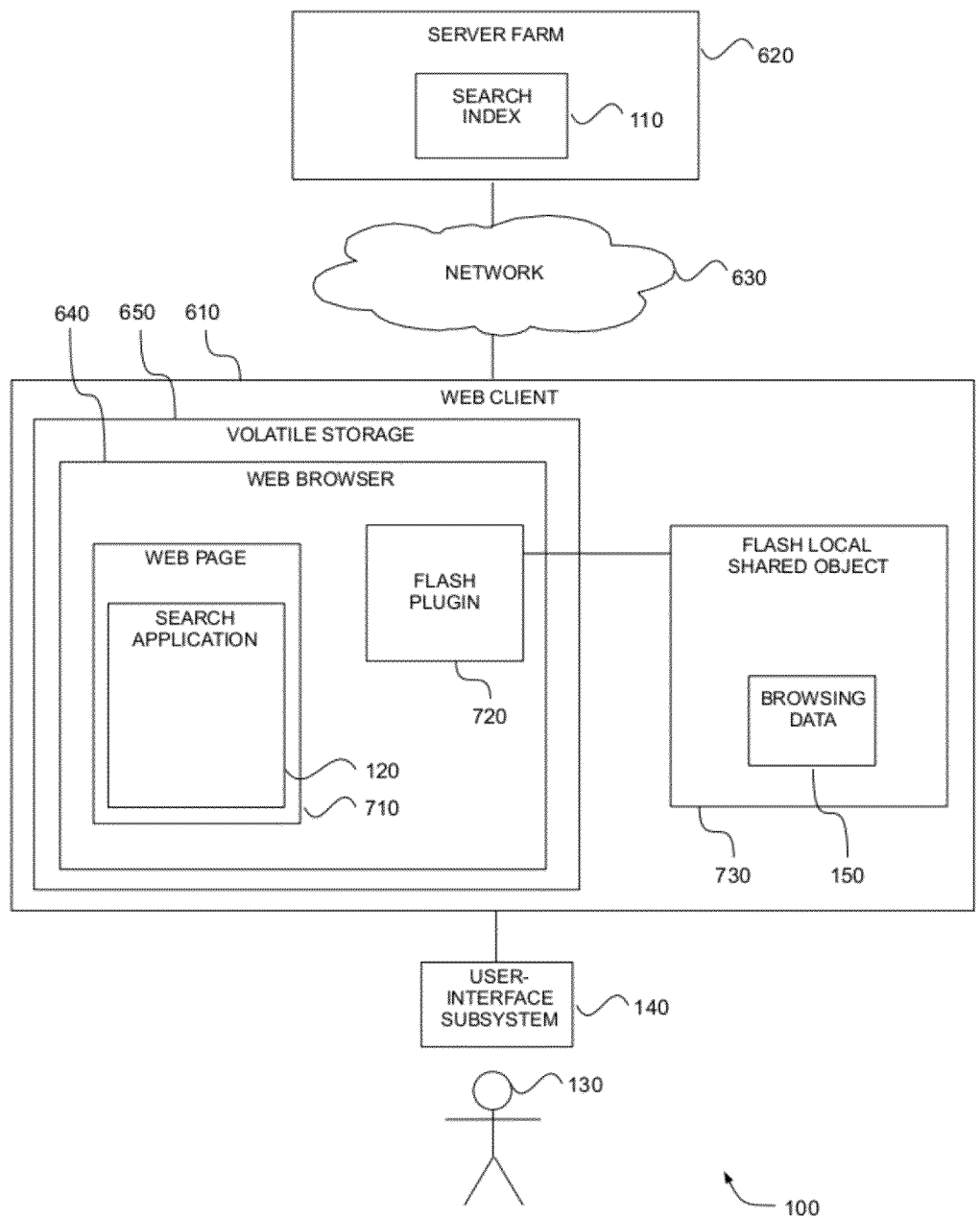
FIG. 7 is a block diagram illustrating a system for browsing real-time results where a search application uses a Flash Local Shared Object, according to one embodiment.

FIG. 7 is a block diagram illustrating system 100 according to one embodiment where search application 120 is implemented using the MXML markup language and the ActionScript programming language, and packaged into a .SWF file pertaining to the Adobe Flash or Adobe Flex application frameworks. The .SWF file is incorporated by reference into a web page 710 that has been downloaded into web browser program 640 and is interpreted by an Adobe Flash plugin 720 installed into web browser program 640.

Web browser program 640 runs on web client computer 610. While running, web browser program 640 is stored in volatile storage 650, but Adobe Flash browser plugin 720 allocates a persistent storage 730, called a Flash local "SharedObject" (hereinafter a "Flash local shared object"), in the file system of web client computer 610. Search application 120 uses persistent storage 730 to store browsing data 150. Advantages of using persistent storage to store browsing data 150 have been described above in connection with FIG. 6.

Search application 120, web client computer 610, server farm 620, network 630, search index 110 and user-interface subsystem 140 are otherwise as described in connection with FIG. 6.

Figure 8:
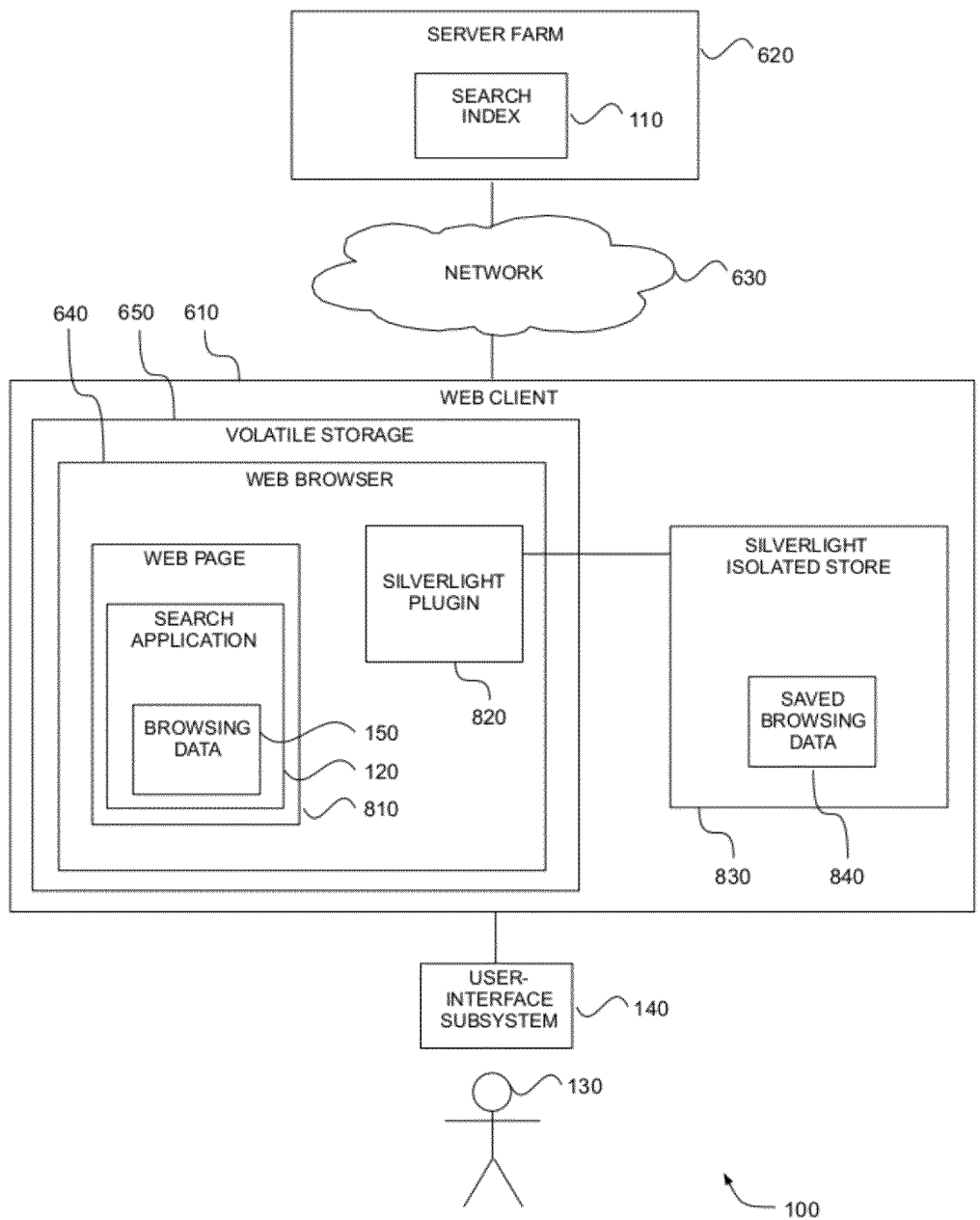
FIG. 8 is a block diagram illustrating a system for browsing real-time results where a search application uses a Silverlight Isolated Store, according to one embodiment.

FIG. 8 is a block diagram illustrating system 100 according to one embodiment where search application 120 is implemented using the XAML markup language and one of the Microsoft .NET programming languages such as C#. Search application 120 is packaged into a .XAP file pertaining to the Microsoft Silverlight application framework. The .XAP file is incorporated by reference into a web page 810 that has been downloaded into web browser program 640 and is interpreted by a Microsoft Silverlight plugin 820 installed into web browser program 640.

Web browser program 640 runs on web client computer 610. While running, web browser program 640 is stored in volatile storage 650, but Microsoft Silverlight browser plugin 820 allocates a persistent storage 830, called a Silverlight "Isolated Store" (hereinafter, a "Silverlight isolated store"), in a file system of web client computer 610. Search application 120 cannot readily store and manipulate browsing data 150 in persistent storage 830, because persistent storage 830 exposes a file-system style interface rather than an object style interface. Instead, search application 120 stores browsing data 150 as C# data structures within its own working memory, which resides in volatile storage 650, but saves it by copying it to persistent storage 830 as saved browsing data 840 before search application 120 exits, and restores by copying it back to volatile storage 650 when search application 120 is restarted. Search application 120 is programmed to listen to an "Application.Exit" event and save browsing data 150 to persistent storage 830 before web browser program 640 leaves web page 810 or exits altogether. Thus user 130 is able to resume browsing a time-varying result set after exiting web browser program 640, and even after turning off web client computer 610, without search application 120 forgetting what results are deemed to have been seen.

Search application 120, web client computer 610, server farm 620, network 630, search index 110 and user-interface subsystem 140 are otherwise as described in connection with FIG. 6.

Figure 9:
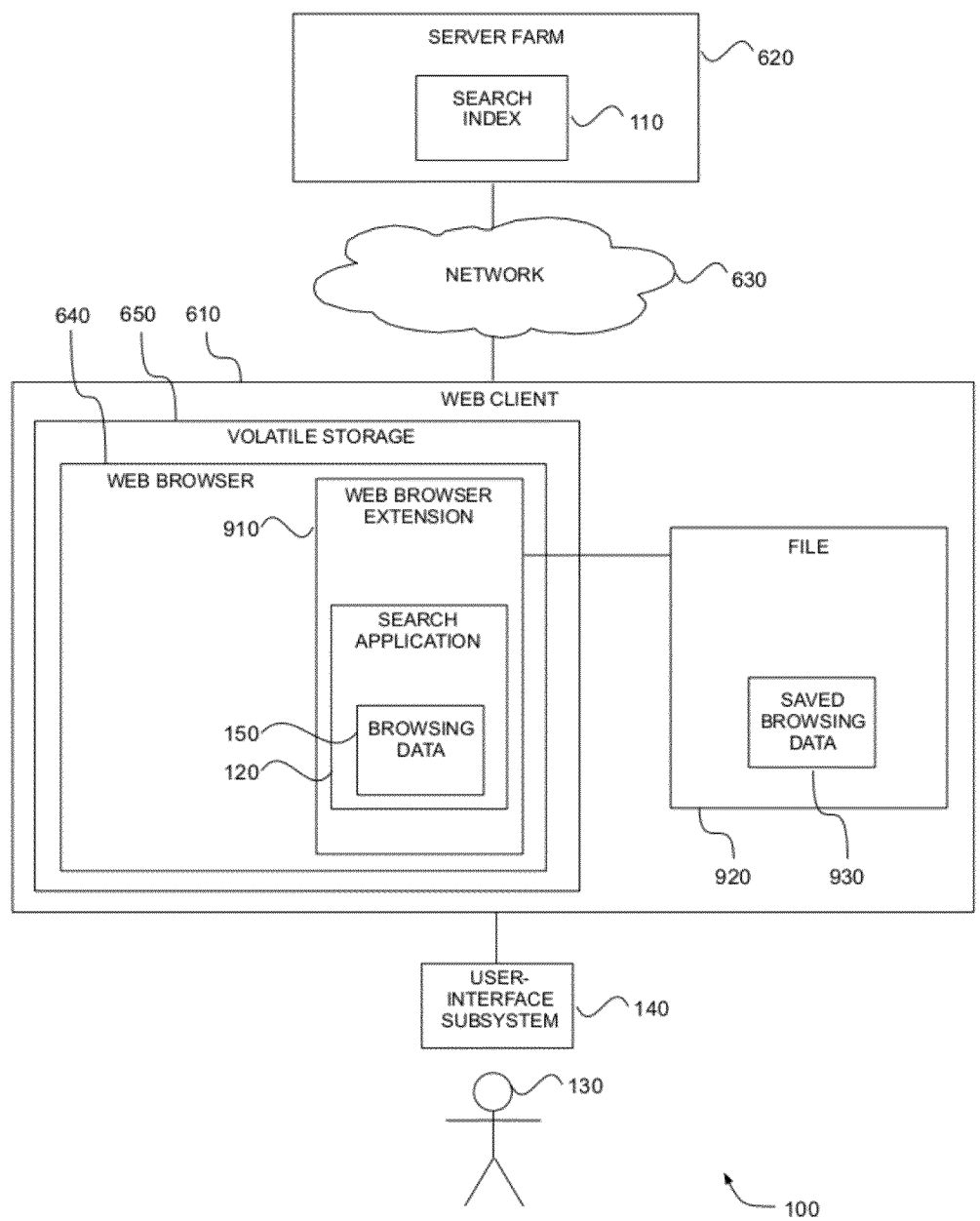
FIG. 9 is a block diagram illustrating a system for browsing real-time results where a search application resides in a web browser extension, according to one embodiment.

FIG. 9 is a block diagram illustrating system 100 according to one embodiment where search application 120 is implemented within an extension 910 of web browser program 640. Web browser program 640 runs on web client computer 610. While running, web browser program 640 is stored in a volatile storage 650. In one embodiment, search application 120 stores browsing data 150 as JavaScript data structures within its own working memory, which resides in volatile storage 650. However, it is notified of impending browser exit and saves browsing data 150 before web browser program 640 exits, by copying it to a persistent storage 920, such as a file in a file system of web client computer 610 created by web browser extension 910, as saved browsing data 930. It restores the data by copying it back to volatile storage 650 when web browser program 640 is restarted. Thus user 130 is able to resume browsing a time-varying result set after exiting web browser program 640, and even after turning off web client computer 610, without search application 120 forgetting what results are deemed to have been seen.

Search application 120, web server computer 610, server farm 620, network 630, search index 110 and user-interface subsystem 140 are otherwise as described in connection with FIG. 6.

Figure 10:
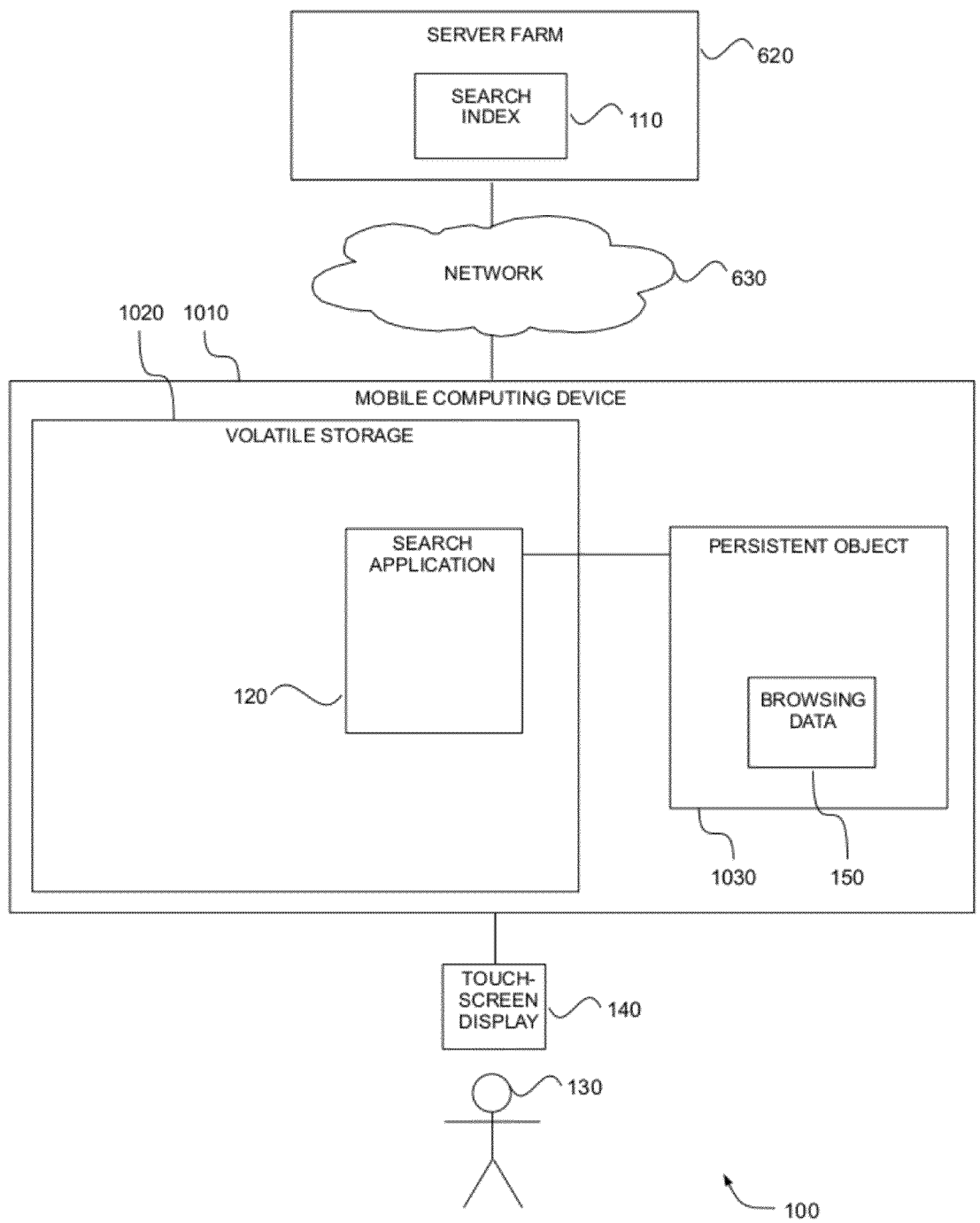
FIG. 10 is a block diagram illustrating a system for browsing real-time results where a native search application uses a Persistent Object, according to one embodiment.

FIG. 10 is a block diagram illustrating system 100 according to one embodiment where search application 120 is a native application running on a mobile computing device 1010, such as a smart phone or a tablet. Search application is stored in a volatile storage 1020, but browsing data 150 is stored in a persistent storage 1030, such as a Persistent Object accessible to search application 120 by means of a Managed Object Context provided by the Core Data framework available in Apple's iOS operating system. The fact that browsing data 150 resides in persistent storage makes it possible for user 130 to resume browsing a time-varying result set after exiting and restarting search application 120, and even after powering off mobile computing device 1010, without search application 120 forgetting what results are deemed to have been seen.

User 130 communicates with search application 120 via user-interface subsystem 140, which is a touch-screen display. The connection between mobile computing device 1010 and mobile computing device 1010 and touch-screen display 140, which is illustrated by a line in FIG. 10, is implemented by touch-screen display 140 being embedded in mobile computing device 1010.

Search index 110 resides in a server farm 620 connected to mobile computing device 1010 through a network 630, such as the Internet or an intranet. Search application 120 accesses search index 110 over network 630 via a web API exposed by server farm 620.

Figure 11:
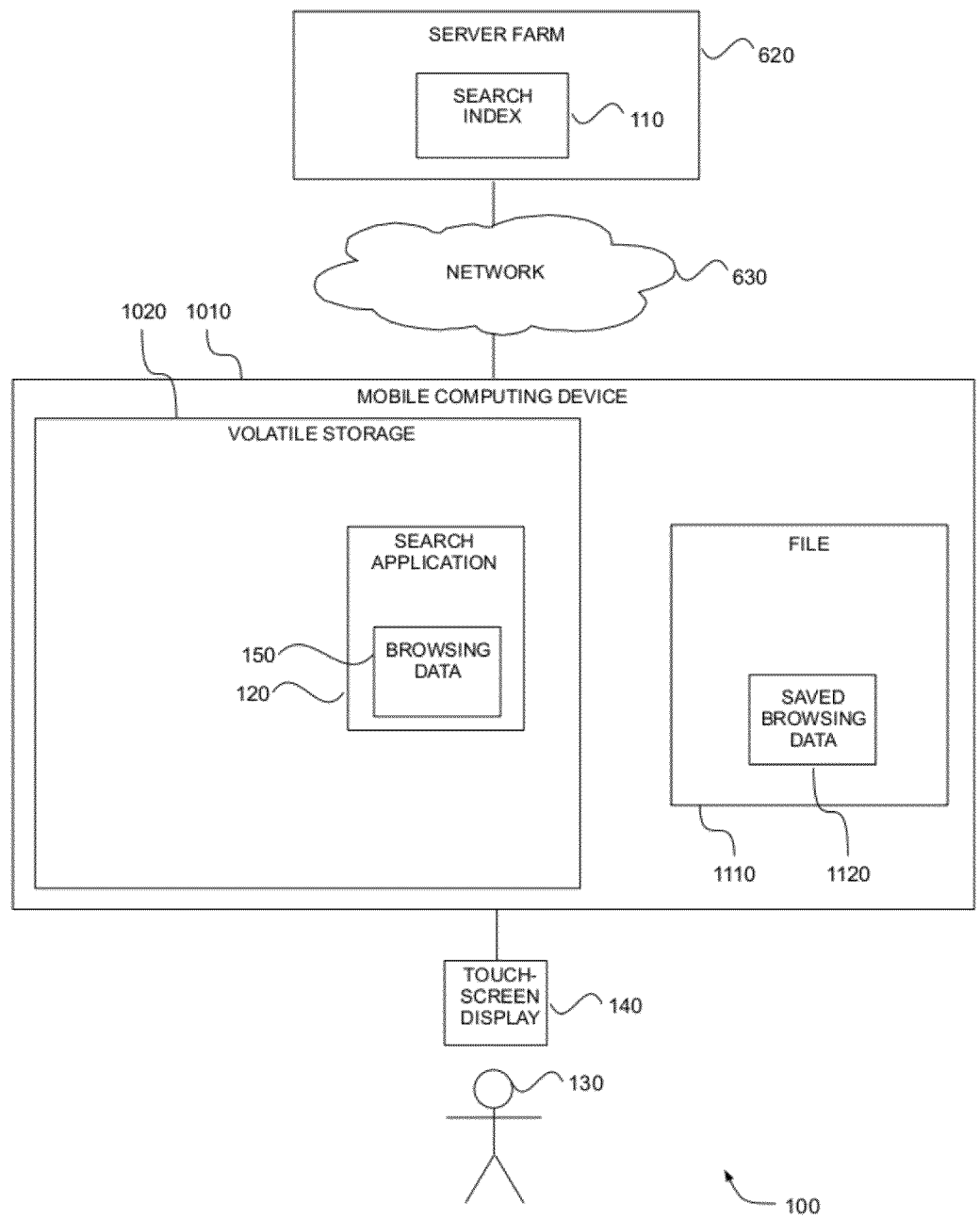
FIG. 11 is a block diagram illustrating a system for browsing real-time results where a native search application saves browsing data from a volatile storage to a persistent storage, according to one embodiment.

FIG. 11 is a block diagram illustrating system 100 according to one embodiment where search application 120 is a native application running on mobile computing device 1010, such as a smart phone or a tablet, that stores browsing data 150 as data structures in its own working memory, within volatile storage 1020. Search application 120 is notified of an impending exit and saves browsing data 150 to a file 1110 in a file system of mobile computing device 1110, used as persistent storage, as saved browsing data 1120; it restores the data by copying it back to volatile storage 1020 when it is restarted. This allows user 130 to resume browsing a time-varying result set after exiting and restarting search application 120, and even after powering off mobile computing device 1010, without search application 120 forgetting what results are deemed to have been seen.

Search application 120, mobile computing device 1010, server farm 620, network 630, search index 110 and user-interface subsystem 140 are otherwise as described in connection with FIG. 10.

Referring back to FIG. 1, in one embodiment, index 180 refers to a collection of documents, such as web pages, PDF files, blog posts, comments, news items, videos, images, tweets, etc. The documents in the collection are found by means such as crawling the web, collecting blog posts and comments from syndication feeds using protocols such as RSS and Atom, collecting tweets from a streaming API provided by Twitter, and reading databases of media files, social updates, and other content. Index 180 contains entries, each entry associating a keyword or keyphrase with a list of references to documents, all lists being ordered according to a common ranking of all the documents in the collection. Given a query, software with access to index 180 can enumerate the documents of the collection that match the query in the order determined by the ranking, producing a list of results, each result being a record that that describes a document. The complete list of results for a query is called the result set of the query. When the collection of documents is large it may be impossible to enumerate a complete result set of a query, but it is nevertheless possible to enumerate an initial portion of it.

In one embodiment, illustrated by FIG. 2, search application 120 accesses search index 110 directly, enumerates initial portions of result sets (which may be full result sets), and obtains ranges of results by extracting them from such initial portions of result sets. In an alternative embodiment, illustrated by FIG. 3, software running in search backend server farm 320 is entrusted with accessing search index 110, enumerating initial portions of result sets and extracting ranges of results from those initial portions, search application 120 obtaining ranges of results by requesting them from said software over network 330. In alternative embodiments, illustrated by FIGS. 6, 7, 8, 9, 10 and 11, software running in server farm 620 is entrusted with accessing index 110, enumerating initial portions of result sets and extracting ranges of results from those initial portions, search application 120 obtaining ranges of results by requesting them from said software over network 630 via the web API exposed by server farm 620.

FIG. 12 is block diagram illustrating an example of a result 1200 belonging to a result set of a query consisting of a conjunction of keywords "smoothie", "banana", and "orange", according to one embodiment. Result 1200 is a record describing a blog post. The record includes three data items: a uniform resource locator (URL) data item 1210 pointing to the blog post, a Title data item 1220, containing the title of the blog post, and a Snippet data item 1230 containing portions of the blog post that mention the keywords of the query. In one embodiment records describing different kinds of documents have different sets of data items. For example, a record describing a tweet may include a data item containing the Twitter username of the sender of the tweet and a data item containing the time at which the tweet was sent. In one embodiment, records describing documents are encoded in a language suitable for describing data structures, such as XML or JSON.

URL data item 1210 plays two roles. It is a reference to the document (the blog post in the example) described by result 1200. It is also an identifier of result 1200, used by search application 120 to remember whether result 1200 is deemed to have been seen.

FIG. 13 illustrates a rendering 1300 of result 1200 on user-interface subsystem 140 according to one embodiment. The rendering comprises: a hyperlink 1310 that uses URL 1210 to point to the document described by result 1200, and whose label is Title data item 1220; a paragraph 1320 containing Snippet data item 1230; and a line 1330, with wrap-around as needed, containing URL 1210 (rendered as text rather than as a hyperlink). In one embodiment hyperlink 1310 is rendered in blue and line 1330 is rendered in green. (A hyperlink is said to "point" to a document if it can be used to navigate to the document.)

(Hereinafter the term "result set" shall be used to refer both to a result set record, such as the record illustrated in FIG. 12, and the rendering of such a record on a display, as illustrated in FIG. 13, as long the intended meaning is clear from the context.)

In one embodiment, search application 120 lets user 130 browse a result set of a query by navigating between results pages, i.e. by visiting results pages in sequence. (A "results page" it not to be confused with a "web page". A results page is displayed within a web page, but the web page contains other elements besides the results page. Hereinafter the word "page", when unqualified, shall refer to a "results page".)

A results page is a collection of visual elements comprising: a list of consecutive results belonging to the page; a user-interface element, such as a checkbox, allowing user 130 to freeze the result set and indicating whether the result set is frozen; and a result set navigation tool. Each results page has a page number. A result "belongs" to the page if it occupies a position in the result set that "belongs" to the page, being less than or equal to the product of a page size and the page number, and greater than said product minus the page size setting (e.g. if the page size is 10, results numbered 1 through 10 belong to page 1, results numbered 11 through 20 belong to page 2, etc.). The page size setting can be changed by the user. The visual elements that comprise a results page are displayed in an area of a web page, the web page comprising other elements such as an input box showing the query and a column of controls for refining the query. In one embodiment, the web page comprises a menu for changing the page size. In an alternative embodiment the menu for changing the page size is included in a separate settings page.

Figure 14:
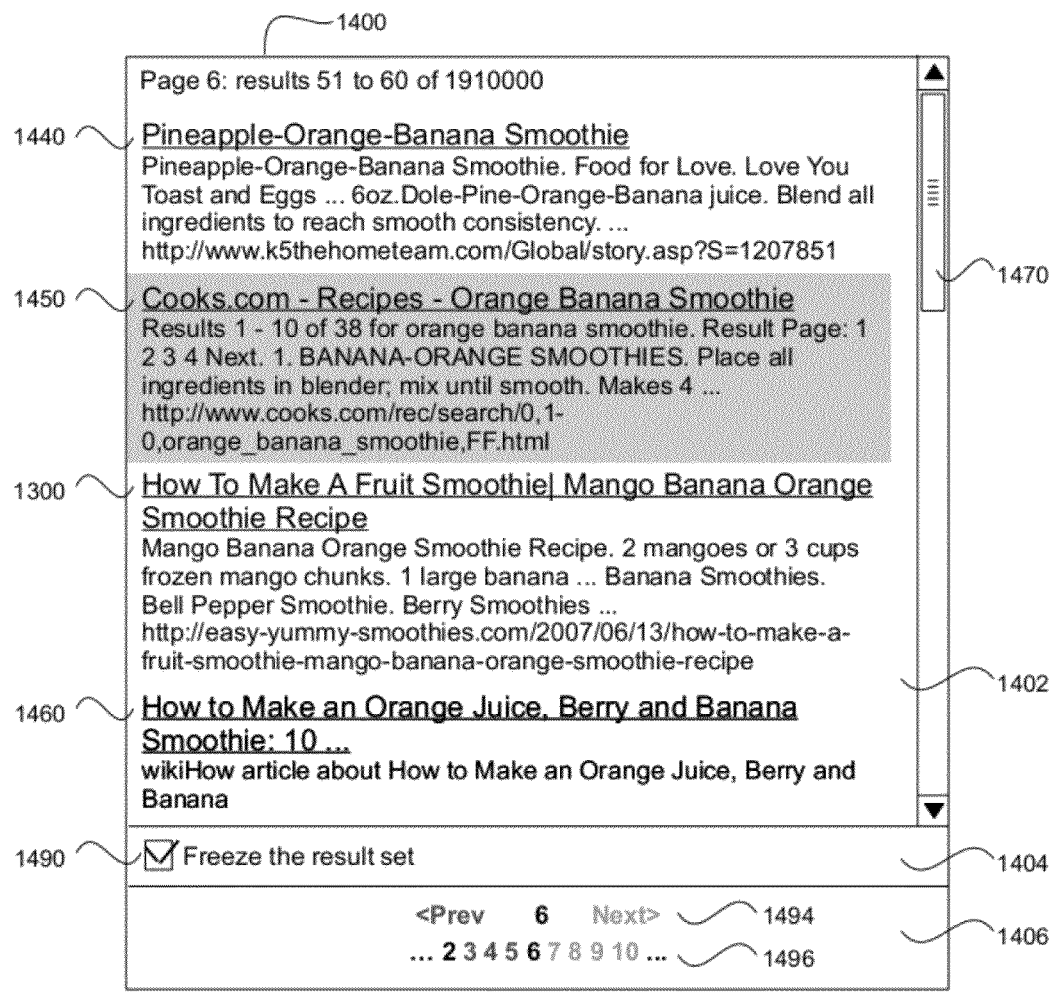
FIG. 14 is a block diagram illustrating a rendering of an example of a search result record on a display, according to one embodiment.

FIG. 14 is an illustration of an example of a results page 1400. Results page 1400 is page number 6 of the result set of the query consisting of the conjunction of keywords "smoothie", "banana", and "orange" previously mentioned in connection with FIG. 12.

Results page 1400 comprises a top section 1402 containing a list of consecutive results, including: a result 1440 that occupies position 51 in the result set; a result 1450 that occupies position 52 in the result set, the result being de-emphasized by rendering it with a dark background, indicating that, in the example, it is deemed to have been seen; the result 1300 shown above in FIG. 13, which occupies position 53 of the result set in the example; a partially shown result 1460 that occupies position 54 in the result set; and results occupying positions 55 through 60 in the result set, which user 130 can make visible using a scroll bar 1470. (Scroll bar 1470 controls the scrolling of top section 1402, which is a visual container where results are rendered, such as in HTML iFrame or a Flex VBox. In an alternative embodiment no visual container is used for rendering results and the entire web page 1400 has to be scrolled to see all the results.)

Results page 1400 also comprises a middle section 1404 containing a checkbox 1490 for freezing the result set and indicating whether the result set is frozen. When the result set is frozen, search application 120 does not obtain results from search index 110; it uses instead results that it has stored within browsing data 150. This allows the user to browse a snapshot of the result set without being distracted by result set changes.

Results page 1400 also comprises a bottom section 1406 containing a page menu that user 130 can use as a navigation tool to terminate the visit to the currently visited page (the "current page") and visit another page (or, as a special case, to terminate the visit to the current page and visit again the same page, thus "refreshing" the current page). The page menu in section 1406 has two rows of buttons: a top row 1494 comprising a button labeled "<Prev" for visiting the previous page (page number 5 in the example), followed by a button for refreshing the current page (page number 6 in the example), followed by a button labeled "Next>" for visiting the next page (page number 7 in the example); and a bottom row 1496 containing another button for refreshing the current page, surrounded by buttons for visiting neighboring pages.

In one embodiment, user 130 can use a page menu button to navigate to a page in two different ways: an ordinary way, and an exceptional way. The ordinary way implies an acknowledgement that user 130 has visited the current page, causing the results in the current page to be deemed as having been seen. The exceptional way allows the user to navigate without acknowledging the visit to the current page, so that results in the current page will not be deemed to have been seen. Two different user-interface actions on a page menu button are used for the two ways of navigating, a navigation-with-visit-acknowledgement user-interface action for the ordinary way, and a navigation-without-visit-acknowledgement user-interface action for the exceptional way.

In one embodiment where user-interface subsystem 140 comprises a keyboard, a pointing device and a display as illustrated in FIG. 4, the navigation-without-visit-acknowledgement user-interface action is a shift-click, consisting of clicking the page menu button while holding down a shift key on the keyboard, while the navigation-with-visit-acknowledgement user-interface action is an unmodified click, consisting of clicking the button without holding down any modifier key on the keyboard.

In one embodiment where user-interface subsystem 140 comprises a touch-screen display as illustrated in FIG. 5, the navigation-without-visit-acknowledgement user-interface action is a tap gesture, consists of tapping the button with a finger or stylus, while the navigation-with-visit-acknowledgement user-interface action is a press-and-hold gesture, consisting of touching the button with a finger or stylus for a period of time longer than a threshold.

A page menu button can be in one of three states, highlighted, de-emphasized, or disabled, the states distinguished by different colors or shades of grey. In the illustration of FIG. 14 highlighted buttons are rendered in black, de-emphasized buttons in dark grey, and disabled colors in light grey. A button is disabled if none of the results in the corresponding results page is currently reachable, because the result set is frozen or because it is not possible to retrieve results from search index 110 at positions higher than a certain maximum height (e.g. 1000); otherwise the button is de-emphasized if every reachable result in the corresponding results page is deemed to have been seen; otherwise the button is highlighted.

In the example of FIG. 14, the buttons labeled by page numbers 7, 8, 9, and 10 are disabled because the result set is frozen as indicated by the checkmark in checkbox 1490 and pages numbered 7, 8, 9 and 10 of the result set have not been visited before in the example. The two buttons labeled by page number 6 (one in each row) are highlighted because page number 6 contains results that are not deemed to have been seen, including at least, according to FIG. 14, result 1440 that occupies position 51 in the result set, result 1300 that occupies position 53 in the result set, and result 1460 that occupies position 54 in the result set. It is assumed in the example that pages numbered 1 through 5 have been visited before. The buttons labeled with page numbers 1, 3, 4, and 5 are de-emphasized, but the button labeled with page number 2 is highlighted because it is assumed in the example that it contains at least one result that was present in a higher-numbered page such as, e.g., page number 8, when page number 2 was visited. The button labeled "Next>" is disabled because it points to page 7, and the button "<Prev" is de-emphasized because it points to page 5.

Figure 15:
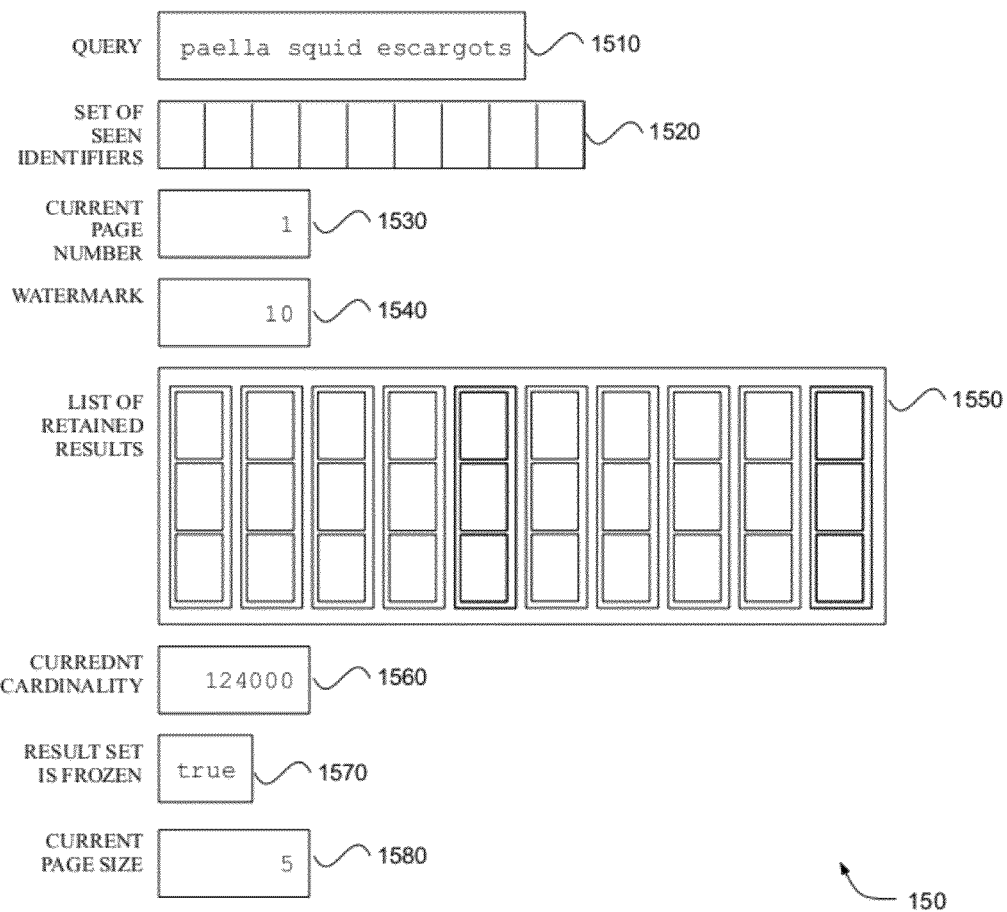
FIG. 15 is a block diagram illustrating an example of browsing data items, according to one embodiment.

FIG. 15 illustrates an example of browsing data 150, according to an embodiment, comprising the following data items:

the query 1510 whose result set is being browsed;

a set 1520 of identifiers of deemed-to-have-been-seen results ("seen identifiers" for short), identifiers being URLs in one embodiment (illustrated earlier in FIG. 1200);

a current page number 1530;

a watermark 1540, which is used to remember the highest position reached in the result set through navigation;

a list 1550 of retained results, comprising the results that were last obtained by search application 120 from search index 110 (the search application obtaining results from the list of retained results rather than from search index 110 when the result set is frozen);

a current cardinality 1560, which is an estimate of the number of results in the result set at the time when search application 120 last obtained results from search index 110;

a truth value 1570 indicating whether the result set is frozen; and a current page size 1580.

The following sequence of events provide an example of how search application 120 uses some of the data items of browsing data 150, according to one embodiment.

Initially the current-page-size data item 1580 is set to 5 (in the example).

Event 1: user 130 issues a query (with keywords "paella", "squid", "escargots" in the example) and automatically visits page 1 of the result set of the query. The set-of-seen-identifiers data item 1520 is set to the empty set. The current-page-number data item 1530 is set to 1. The watermark data item 1540 is set to 5. Results 1 through 5 of query 1510 are obtained from search index 110, together with an estimate of the result set cardinality, e.g. 123000. The list-of-retained-results data item 1550 is set to the list of results 1 through 5. The current-cardinality data item 1560 is set to 123000. The result-set-is-frozen data item 1570 is set to "false".

Event 2: user 130 navigates to page 2 with acknowledgement of the visit to page 1. The five identifiers of the results in page 1 are added to the set-of-seen-identifiers data item 1520, which now has 5 elements. The current-page-number data item 1530 is set to 2. The watermark data item 1540 is set to 10. Results 1 through 10 (not just 6 through 10) of query 1510 are obtained from search index 110, together with an estimate of the cardinality of the result set. The result set has changed since event 1: one result that belonged to page 2 has moved to page 1, and one result that belonged to page 1 has moved to page 2; there is also a new cardinality estimate, 124000. The list-of-retained-results data item 1550 is set to the list of newly obtained results 1 through 10. Page 2 is displayed, showing the results 6 through 10 newly added to the list-of-retained-results data item 1550. The identifier of the result that has moved from page 1 to page 2 is found in the set-of-seen-identifiers data item 1520, causing the result to be de-emphasized in page 2, the other four results being highlighted. The identifier of the result that has moved from page 2 to page is not found in the set-of-seen-identifiers data item 1520, causing the buttons that point to page 1 (the button labeled "1" and the button labeled "<Prev") in the page menu of page 2 to be highlighted. The current-cardinality data item 1560 is set to 124000.

Event 3: seeing that the buttons that point to page 1 are highlighted, user 130 navigates back to page 1, with acknowledgement of the visit to page 2. The identifiers of the four highlighted results of page 2 are added to the set-of-seen-identifiers data item 1520. (The identifier of the de-emphasized result is already in the set). The current-page-number data item 1530 is set to 1. The watermark data item 1540 is not changed. Results 1 through 10 (not just 1 through 4) are obtained from search index 110. This time the result set has not changed, so the list-of-retained-results data item 1550 and the current-cardinality data item 1560 do not change. Page 1 is displayed, showing results 1 through 5 from the list-of-retained-results data item 1550; the identifier of the result that moved earlier from page 2 to page 1 is not found in the set-of-seen-identifiers data item 1520, causing the result to be highlighted; the other four results of page 1 are de-emphasized.

After event 3 search application data is as illustrated in FIG. 15: the set-of-seen-identifiers data item 1520 has 9 identifiers, as depicted; the current-page-number data item 1530 is set to 1; the watermark data item 1540 is set to 10; the list-of-retained-results data item 1550 has 10 elements, depicted in FIG. 15 as records having 3 data items each (stacked vertically in the illustration); the current-cardinality data item 1560 is set to 124000; the result-set-is-frozen data item 1570 is set to "true"; and the current page size is 5.

Figure 16:
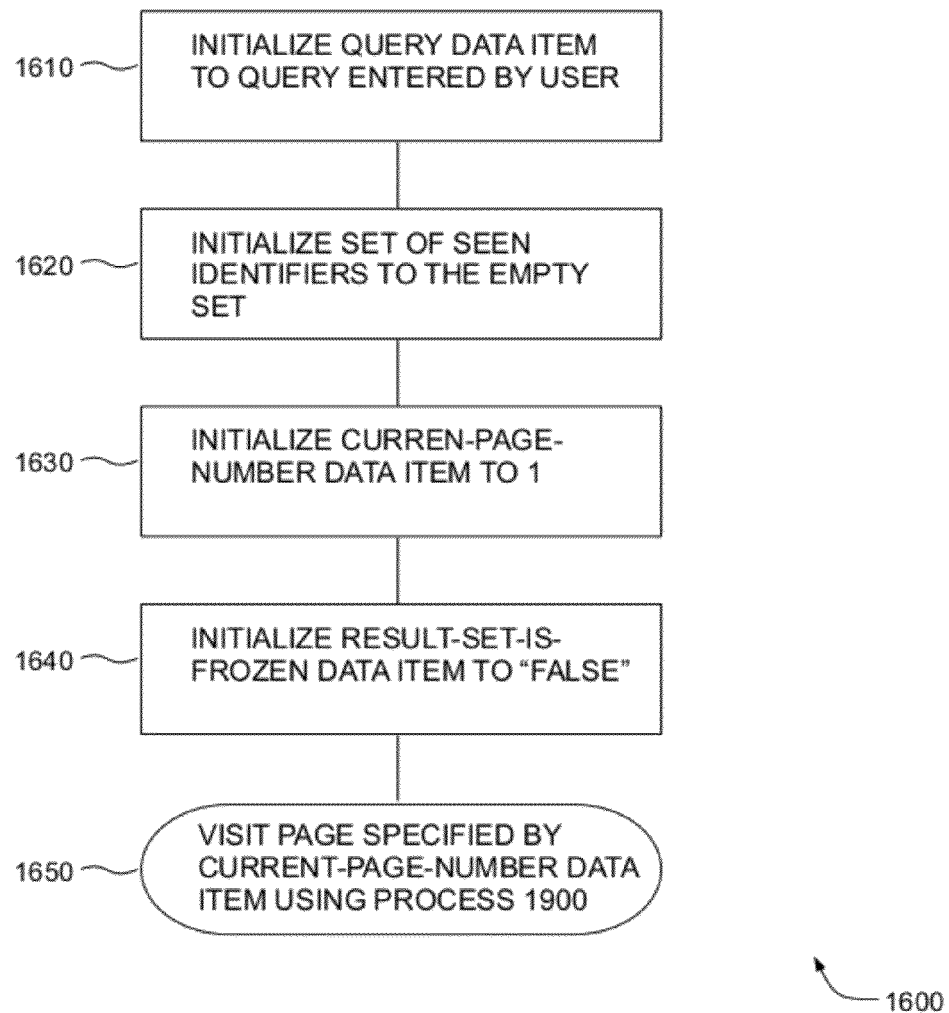
FIG. 16 is a flow diagram illustrating a method of initializing browsing data when a user submits a query, according to one embodiment.

FIG. 16 is a flow diagram generally illustrating one embodiment of a process 1600 followed by search application 120 when user 130 submits a query.

At 1610 search application 120 initializes query data item 1510 to the query entered by the user.

At 1620 search application 120 initializes the set-of-seen-identifiers data item 1520 to the empty set.

At 1630 search application 120 initializes the current-page-number data item 1530 to 1.

At 1640 search application 120 initializes the result-set-is-frozen data item 1570 to "false".

Figure 19:
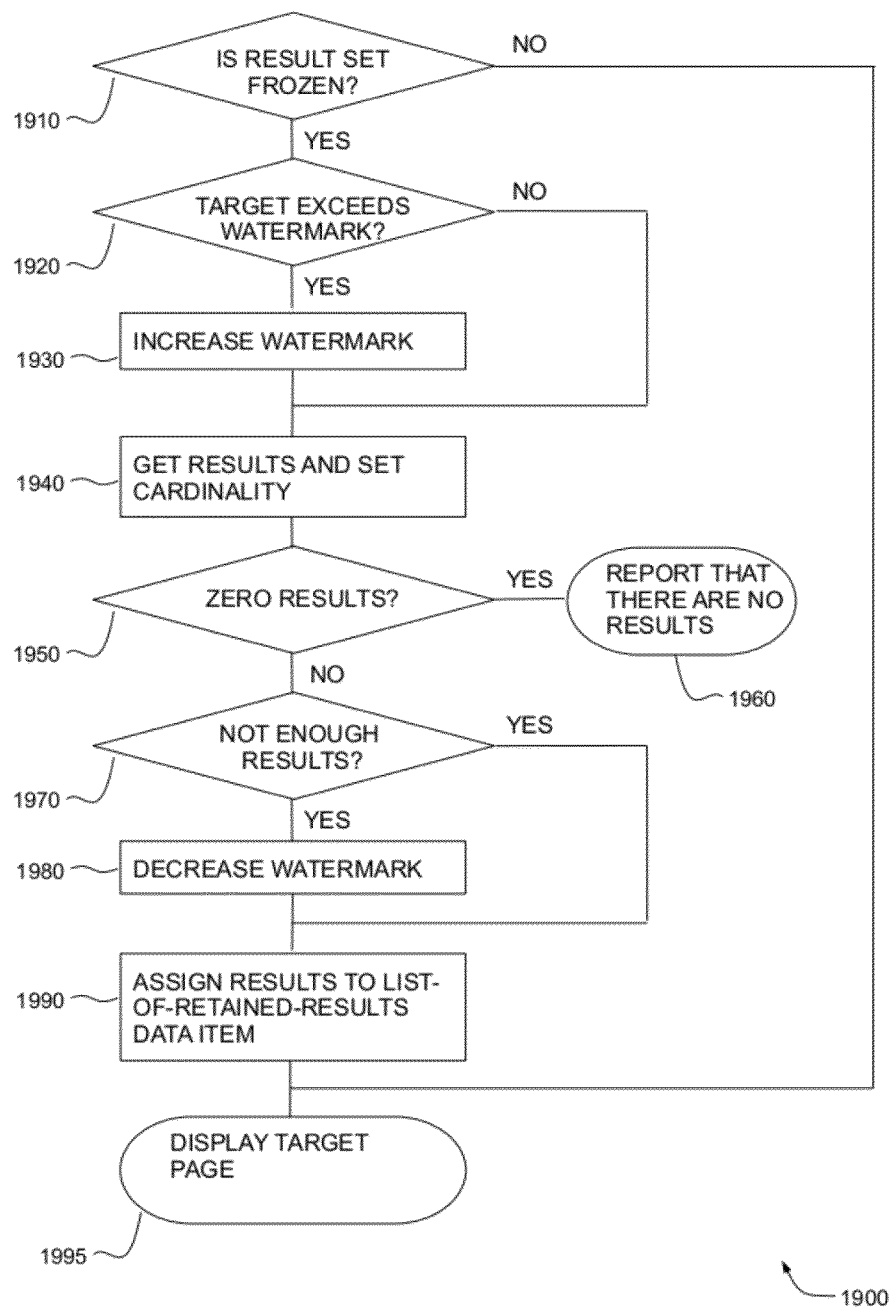
FIG. 19 is a flow diagram illustrating a method of visiting to a results page, according to one embodiment.

At 1650 search application 120 visits the page specified by the current-page-number data item 1530, using process 1900 illustrated in FIG. 19.

Figure 17:
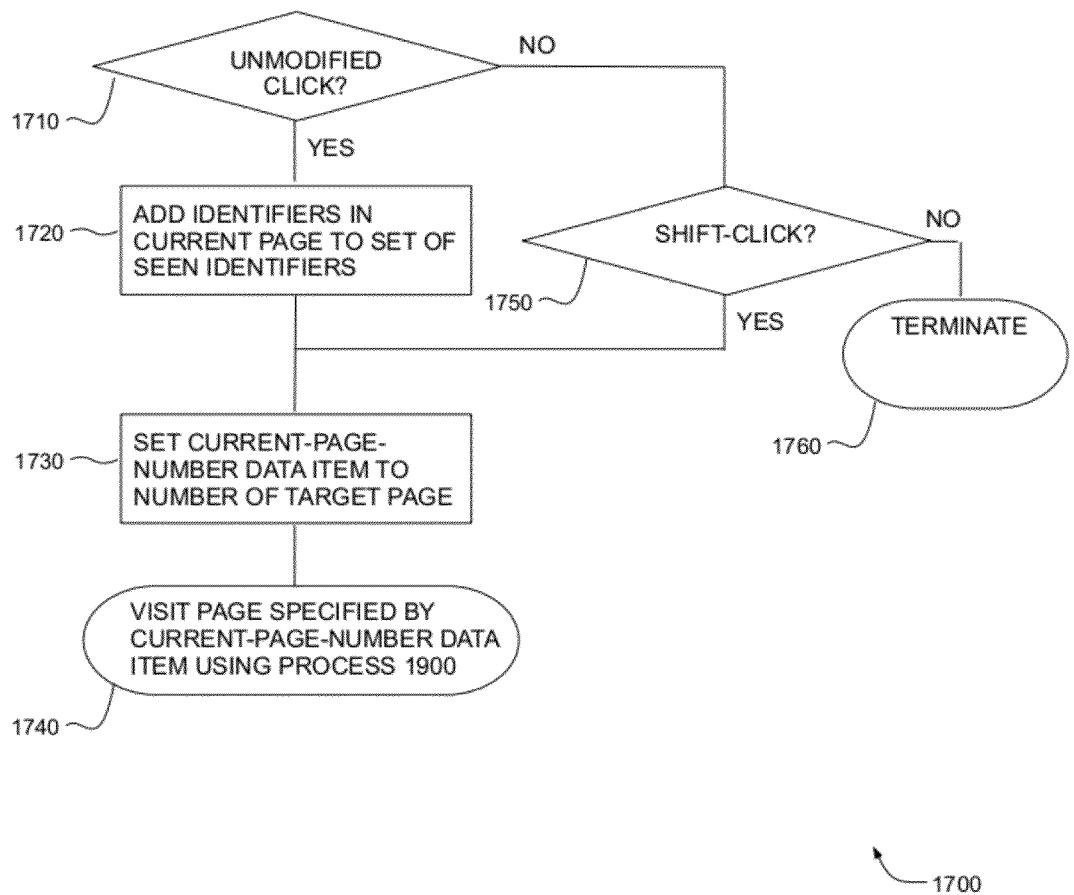
FIG. 17 is a flow diagram illustrating a method of navigating to a results page using a keyboard and a pointing device, according to one embodiment.

FIG. 17 is a flow diagram generally illustrating one embodiment of a process 1700 followed by search application 120 when user 130 performs a user-interface action on a page menu button pointing to a target page, using a user-interface subsystem comprising a display 410, a keyboard 420 and a pointing device 430 as illustrated in FIG. 4.

At 1710 search application 120 checks if the action is an unmodified click. If so, search application 120 proceeds to 1720, otherwise it proceeds to 1750.

At 1750 search application 120 checks if the action is a shift-click. If so it proceeds to 1730, otherwise process 1700 terminates, as indicated at 1760.

At 1720 search application 120 finds the results in the list-of-retained-results data item 1550 that belong to the current page (as determined by the position of each result in the list-of-retained-results and the current-page-number data item 1530), extracts their identifiers, and adds to the set in the set-of-seen-identifiers data item 1520 those not already in the set. Then it proceeds to 1730.

At 1730 search application 120 sets the current-page-number data item 1530 to the number of the target page. Then it proceeds to 1740.

At 1740 search application 120 visits the page specified by the current-page-number data item 1530, using process 1900 illustrated in FIG. 19.

Figure 18:
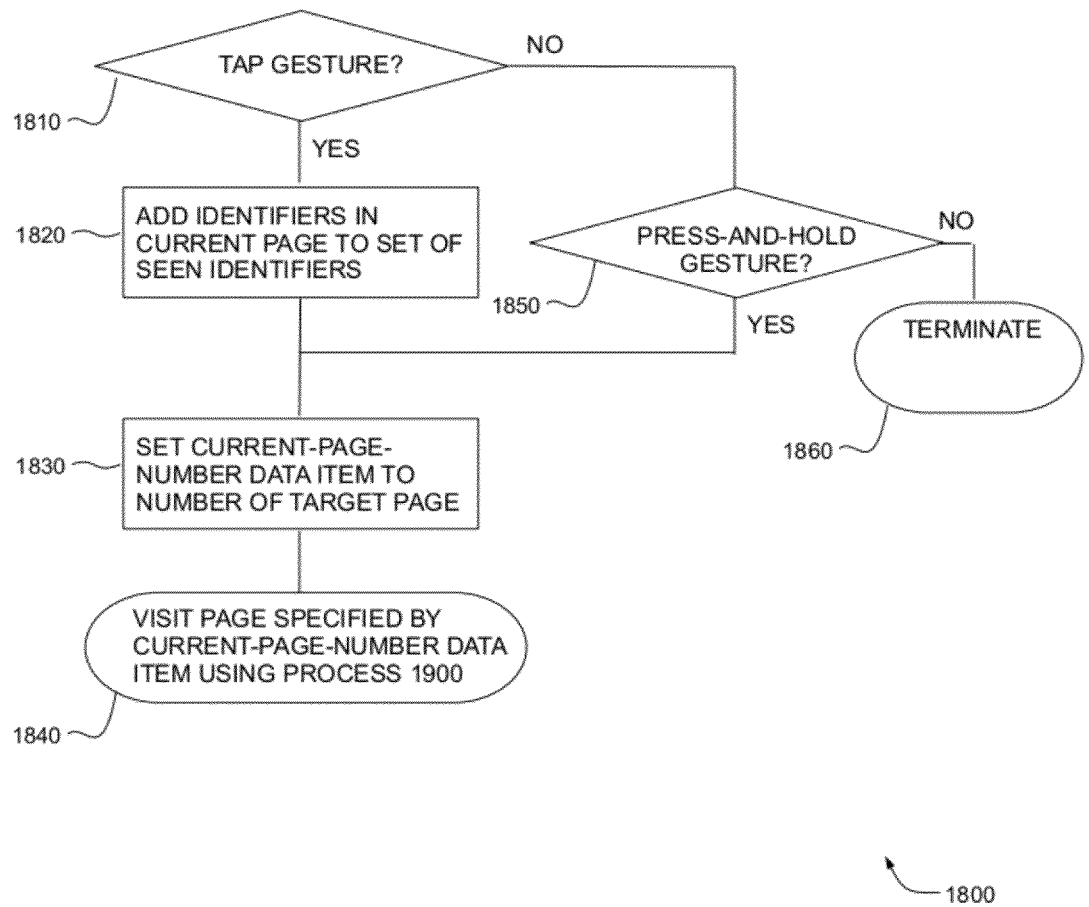
FIG. 18 is a flow diagram illustrating a method of navigating to a results page using a touch-screen device, according to one embodiment.

FIG. 18 is a flow diagram generally illustrating one embodiment of a process 1800 followed by search application 120 when user 130 performs a user-interface action on a page menu button pointing to a target page, using a user-interface subsystem comprising a touch-screen display 510, as illustrated in FIG. 5.

At 1810 search application 120 checks if the action is a tap gesture. If so, search application 120 proceeds to 1820, otherwise it proceeds to 1850.

At 1850 search application 120 checks if the action is a press-and-hold gesture. If so it proceeds to 1830, otherwise process 1800 terminates, as indicated at 1850.

At 1820 search application 120 finds the results in the list-of-retained-results data item 1550 that belong to the current page (as determined by the position of each result in the list-of-retained-results and the current-page-number data item 1530), extracts their identifiers, and adds to the set in the set-of-seen-identifiers data item 1520 those not already in the set. Then it proceeds to 1830.

At 1830 search application 120 sets the current-page-number data item 1530 to the number of the target page. Then it proceeds to 1840.

At 1840 search application 120 visits the page specified by the current-page-number data item 1530, using process 1900 illustrated in FIG. 19.

FIG. 19 is a flow diagram generally illustrating one embodiment of a process 1900 followed by search application 120 to visit the page specified by the current-page-number data item 1530.

At 1910 search application 120 checks if the result-set-is-frozen data item 1570 is "true". If so it proceeds to 1995, otherwise it proceeds to 1920.

At 1920 search application 120 checks if the last result position in the target page, i.e. the product of the target page number and the current-page-number data item 1530, if greater than the watermark data item 1540. If so, it proceeds to 1930, otherwise it proceeds to 1940.

At 1930 search application 120 increases the watermark, setting watermark data item 1540 to the last result position in the target page. Then it proceeds to 1940.

At 1940 search application 120 obtains an estimate of the cardinality of the result set of the query found at query data item 1510 from search index 110, as well as results ranging from position 1 to an end position, the end position being equal to the watermark data item 1540 unless the actual cardinality of the result set is less that the watermark, in which case the end position if equal to the cardinality. If the end position is less than the watermark, search application 120 sets the current-cardinality data item 1560 to the end position. Otherwise search application 120 sets the current-cardinality data item 1560 to the estimate obtain from search index 110. Then search application 120 proceeds to 1950.

At 1950 search application 120 checks whether the cardinality is 0. If so it proceeds to 1960, otherwise it proceeds to 1970.

At 1960 search application 120 reports to user 130 that the query currently has zero results and terminates.

At 1970 search application 120 checks whether the end position is less than the watermark data item 1540. If so it proceeds to 1980, otherwise it proceeds to 1990.

At 1980 search application 120 decreases the watermark, setting watermark data item 1540 to the end position, which is equal to the cardinality of the result set. Then it proceeds to 1990.

At 1990 search application 120 sets the list-of-retained-results data item 1550 to the range of results obtained at 1940. Then it proceeds to 1995.

At 1995 search application 120 displays the target results page as illustrated in the example of FIG. 14.

Specifically, in the target results page displayed at 1995, top section 1402 displays the results of the list-of-retained-results data item 1550 at positions belonging to the page; a result is de-emphasized if its identifier is present in the set-of-seen-identifiers data items 1520. Middle section 1404 comprises a checkbox 1490, the checkbox having a checkmark if the value of the result-set-is-frozen data item 1570 is "false". Bottom section comprises a page menu with a row of buttons 1494 for visiting the previous page, refreshing the current page (which is the target results page), and visiting the next page, and a row of buttons 1496 for visiting neighboring pages.

In one embodiment, in the target results page displayed at 1995, the row of buttons 1496 consists of up to 9 page menu buttons, depending on the current number of pages in the result set, which is computed by dividing the current-cardinality data item 1560 by the current-page-size data item 1580; the row comprises buttons for all pages if there are up to 9 pages in the result set; otherwise it comprises buttons for the first 9 pages if the current page is among them, or buttons for the last 9 pages if the current page is among them, or buttons for 9 pages centered around the current page otherwise.

In one embodiment, in the target results page displayed at 1995, the state of a page menu button for visiting a subsequent page is determined as follows. In one embodiment, the Web API exposed by server farm 620 does not allow the retrieval of results from search index 110 at positions higher than a certain maximum height (e.g. 1000) within the result set. A position within the result set is said to be unreachable if it is greater than such maximum height, or greater than the watermark data item 1540 while the result-set-is-frozen data item 1570 is "true". If the position of the first result in the subsequent page (determined as the product of the page number of the subsequent page and the current-page-size data item 1580, minus the current-page-size data item 1580, plus 1) is unreachable, the button is disabled. Otherwise, if every result in the list-of-retained-results data item 1550 at a reachable position belonging to the subsequent page has an identifier that can be found in the set-of-seen-identifiers data items 1520, the button is de-emphasized. Otherwise the button is highlighted.

Figure 20:
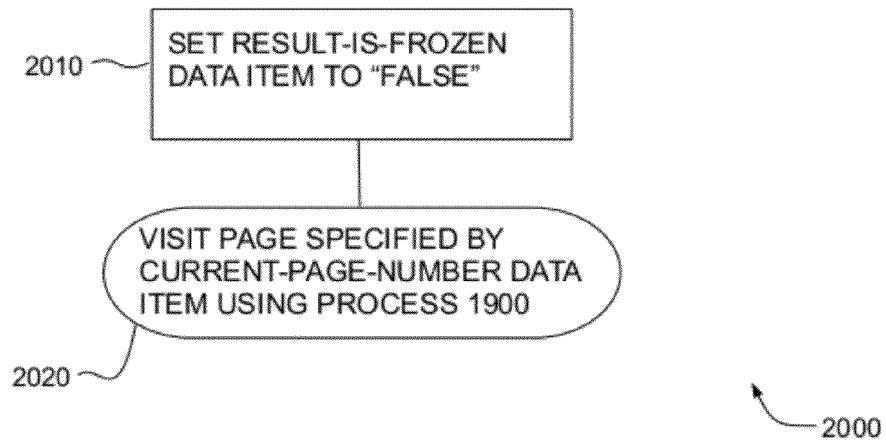
FIG. 20 is a flow diagram illustrating a method of freezing a result set, according to one embodiment.

FIG. 20 is a flow diagram generally illustrating one embodiment of a process 2000 followed by search application 120 when user 130 freezes the result set by performing a user-interface action such as putting a checkmark in checkbox 1490.

At 2010 search application 120 sets the result-set-is-frozen data item 1570 to "true". Then it proceeds to 2020.

At 2020 search application 120 refreshes the current page, i.e. visits it again, using process 1900 illustrated in FIG. 19. Then it terminates.

Figure 21:
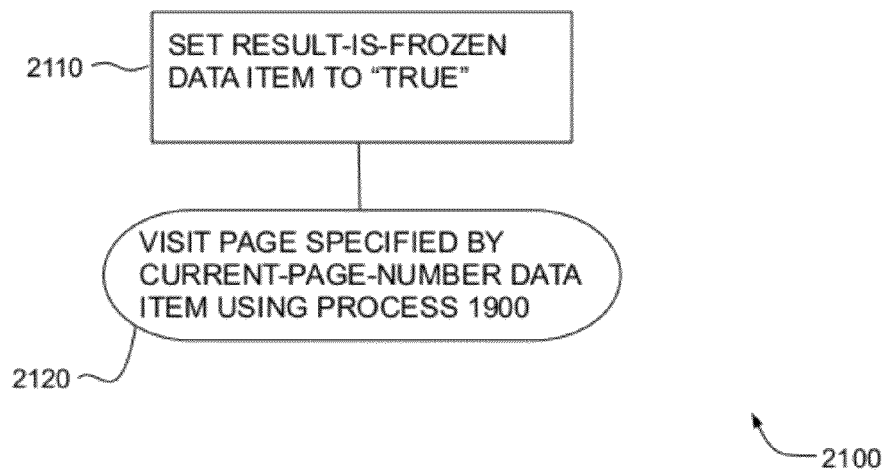
FIG. 21 is a flow diagram illustrating a method of unfreezing a result set, according to one embodiment.

FIG. 21 is a flow diagram generally illustrating one embodiment of a process 2100 followed by search application 120 when user 130 unfreezes the result set by performing a user-interface action such as removing a checkmark from checkbox 1490.

At 2110 search application 120 sets the result-set-is-frozen data item 1570 to "false". Then it proceeds to 2120.

At 2120 search application 120 refreshes the current page, i.e. visits it again, using process 1900 illustrated in FIG. 19. Then it terminates.

Figure 22:
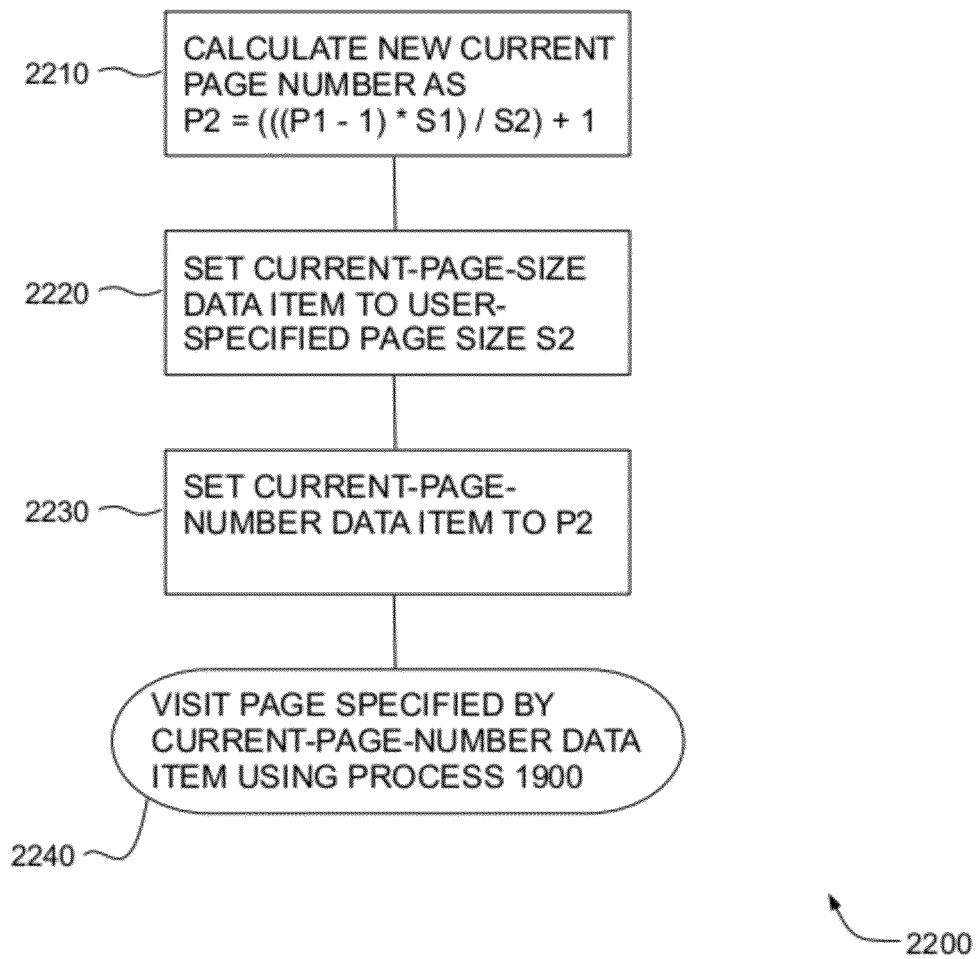
FIG. 22 is a flow diagram illustrating a method of changing a page size, according to one embodiment.

FIG. 22 is a flow diagram generally illustrating one embodiment of a process 2200 followed by search application 120 when user 130 uses a user-interface control to change the page size. The purpose of process 2200 is to change the current page so that the first result position in the current page before the page size change is a position within the current page after the page size change.

At 2210 search application 120 obtains the old page size from current-page-size data item 1580 and the current page number from current-page-number data item 1530, and calculates a new current page number using the formula P2=(((P1−1)*S1)/S2)+1, where P1 and P2 are the current page numbers before and after the page size change (P1 being specified by the user using the user-interface control), S1 and S2 are the old and new page sizes, and "/" denotes integer division. Then it proceeds to 2220.

At 2220 search application 120 sets the current-page-size data item 1580 to the new page size specified by the user. Then it proceeds to 2230.

At 2230 search application 120 sets the current-page-number data item 1530 to the new current page number calculated at step 2210. Then in proceeds to 2240.

At 2240 search application 120 visits the new current page specified by the current-page-number data item 1530, using process 1900 illustrated in FIG. 19.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of visiting a results page, comprising:
    displaying to a user a list of consecutive results belonging to the visited page, the visited page pertaining to a time-varying result set of a search query, a result comprising an identifier, the result being de-emphasized if the identifier is present in a stored set of identifiers of deemed-to-have-been seen results;
    further displaying to the user a result set navigation tool comprising a page menu comprising one or more page menu buttons pointing to corresponding results pages, a page menu button being deemphasized if every result belonging to the corresponding results page comprises an identifier that is present in the stored set of identifiers of deemed-to-have-been-seen results; and
    adding the identifiers comprised in the list of consecutive results to the stored set of identifiers of deemed-to-have-been-seen results before navigating to a new results page, when the user performs a navigation-with-visit-acknowledgement user-interface action.

2. The method of claim 1, wherein the identifier is a reference to a document described by the result.

3. The method of claim 2, wherein the reference is a URL of the document, a rendering of the result including a hyperlink that uses the URL to point to the document.

4. The method of claim 1, further comprising:
    navigating to a results page without adding the identifiers comprised in the list of consecutive results to the stored set of identifiers of deemed-to-have-been-seen results when the user performs a navigation-without-visit-acknowledgement user-interface action.

5. The method of claim 4, wherein the navigation-without-visit-acknowledgement user-interface action is a click on a page menu button while a modifier key is held down on a keyboard, and the navigation-with-visit-acknowledgement user-interface action is a click on a page menu button with no modifier key being held down on the keyboard.

6. The method of claim 4, wherein the navigation-with-visit-acknowledgement user-interface action is a tap gesture on a page menu button shown on a touch-screen display and the navigation-without-visit-acknowledgement user-interface action is a press-and-hold gesture on the page menu button.

7. A system for browsing a time-varying result set of a search query, comprising:
    a user-interface subsystem;
    a storage system containing a search index;
    a storage containing browsing data; and
    a storage containing a search application, the search application executable by a computer to repeatedly perform a method of visiting a results page of the time-varying result set of the search query, the method comprising:
        displaying to a user on a display of the user-interface subsystem a list of consecutive results obtained from the search index and belonging to the visited results page, a result being a record comprising a URL of a corresponding document, the result being rendered on the display as hypertext comprising a hyperlink that uses the URL to point to the document, the result being de-emphasized if the URL is present in a set of URLs of deemed-to-have-been-seen results comprised in the browsing data;
        further displaying to the user on the display of the user-interface subsystem a page menu comprising one or more page menu buttons pointing to corresponding results pages; and
        adding the URLs comprised in the list of consecutive results to the set of URLs of deemed-to-have-been-seen results comprised in the browsing data, when the user uses the user-interface subsystem to navigate with visit acknowledgement.

8. The system of claim 7, wherein: the user-interface subsystem comprises a display, a keyboard, and a pointing device; and navigating with visit acknowledgement is accomplished by clicking on a page menu button with the pointing device.

9. The system of claim 7, wherein: the user-interface subsystem comprises a touch-screen display; and navigating with visit acknowledgement is accomplished by tapping a page menu button.

10. The system of claim 7, wherein: the search application, the browsing data, and the search index reside in a web server computer; the user-interface subsystem is connected to a web client computer; and the web client computer is connected to the web server computer over a network.

11. The system of claim 7, wherein: the search application and the browsing data reside in a web server farm; the search index resides in a server farm; the user-interface subsystem is connected to a web client computer; and the web client computer is connected to the web server computer over a network.

12. The system of claim 7, wherein: the search application is implemented in JavaScript and embedded in a web page downloaded to a web browser program running in a web client computer; the browsing data resides in a persistent HTML5 local storage; and the search index resides in a server farm comprising one or more server computers, the web client computer being connected to the server farm over a network.

13. The system of claim 7, wherein: the search application is a Flash application embedded in a web page downloaded to a web browser program running in a web client computer; the browsing data resides in a persistent Flash local shared object; and the search index resides in a server farm comprising one or more server computers, the web client computer being connected to the server farm over a network.

14. The system of claim 7, wherein: the search application is a Silverlight application embedded in a web page downloaded to a web browser program running in a web client computer; the browsing data resides in a volatile storage that is saved to a persistent Silverlight local storage before the web browser program leaves the web page; and the search index resides in a server farm comprising one or more server computers, the web client computer being connected to the server farm over a network.

15. The system of claim 7, wherein: the search application is implemented within an extension of a web browser program running on a web client computer; the browsing data resides in a volatile storage and is saved to a persistent storage before the web browser program exits; and the search index resides in a server farm comprising one or more server computers, the web client computer being connected to the server farm over a network.

16. The system of claim 9, wherein: the search application is a native application running on a mobile computing device; and the search index resides in a server farm comprising one or more server computers, the web client computer being connected to the server farm over a network.

17. A system for browsing a time-varying result set of a search query, comprising:
　　a user-interface subsystem;
　　a storage system containing a search index;
　　a storage containing browsing data; and
　　a storage containing a search application, the search application executable by a computer to repeatedly perform a method of visiting a results page of the time-varying result set of the search query, the method comprising:
　　　　displaying to a user on a display of the user-interface subsystem a user-interface element allowing the user to freeze the result set and indicating to the user whether the result set is frozen;
　　　　further displaying to the user on the display of the user-interface subsystem a list of consecutive results belonging to the visited results page, the results being obtained from the search index if the result set is not frozen, the results being obtained from a list of retained results comprised in the browsing data if the result set is frozen, a result being a record comprising a URL of a corresponding document, the result being rendered on the display as hypertext comprising a hyperlink that uses the URL to point to the document, the result being de-emphasized if the URL is present in a set of URLs of deemed-to-have-been-seen results comprised in the browsing data;
　　　　further displaying to the user on the display of the user-interface subsystem a page menu comprising one or more page menu buttons pointing to corresponding results pages; and
　　　　adding the URLs comprised in the list of consecutive results to the set of URLs of deemed-to-have-been-seen results stored in the browsing data when the user uses the user-interface subsystem to navigate with visit acknowledgement.

18. The system of claim 17 wherein a checkbox is used as the user-interface element allowing the user to freeze the result set and indicating to the user whether the result set is frozen.

* * * * *